US011885871B2

(12) United States Patent
Ilic et al.

(10) Patent No.: US 11,885,871 B2
(45) Date of Patent: Jan. 30, 2024

(54) RADAR HEAD POSE LOCALIZATION

(71) Applicant: Magic Leap, Inc., Plantation, FL (US)

(72) Inventors: Alexander Ilic, Zurich (CH); Martin Georg Zahnert, Zurich (CH); Koon Keong Shee, Miramar, FL (US)

(73) Assignee: Magic Leap, Inc., Plantation, FL (US)

( * ) Notice: Subject to any disclaimer, the term of this patent is extended or adjusted under 35 U.S.C. 154(b) by 629 days.

(21) Appl. No.: 17/058,586

(22) PCT Filed: May 24, 2019

(86) PCT No.: PCT/US2019/033987
§ 371 (c)(1),
(2) Date: Nov. 24, 2020

(87) PCT Pub. No.: WO2019/231850
PCT Pub. Date: Dec. 5, 2019

(65) Prior Publication Data
US 2021/0141076 A1 May 13, 2021

Related U.S. Application Data

(60) Provisional application No. 62/678,621, filed on May 31, 2018.

(51) Int. Cl.
*G01S 13/58* (2006.01)
*G01S 13/536* (2006.01)
(Continued)

(52) U.S. Cl.
CPC .......... *G01S 13/536* (2013.01); *G01S 13/582* (2013.01); *G01S 13/587* (2013.01); *G01S 13/588* (2013.01);
(Continued)

(58) Field of Classification Search
CPC . G01C 21/1652; G01S 13/343; G01S 13/536; G01S 13/582; G01S 13/584;
(Continued)

(56) References Cited

U.S. PATENT DOCUMENTS 4,344,092 A 8/1982 Miller
4,652,930 A 3/1987 Crawford
(Continued)

FOREIGN PATENT DOCUMENTS

CN 101449270 A 6/2009
CN 104040410 A 9/2014
(Continued)

OTHER PUBLICATIONS

"Decision of Rejection dated Jan. 5, 2023 with English translation", Chinese Patent Application No. 201880079474.6, (10 pages).
(Continued)

*Primary Examiner* — Timothy A Brainard
(74) *Attorney, Agent, or Firm* — Stephen M. De Klerk

(57) ABSTRACT

An augmented reality device has a radar system that generates radar maps of locations of real world objects. An inertial measurement unit detects measurement values such as acceleration, gravitational force and inclination ranges. The values from the measurement unit drift over time. The radar maps are processed to determine fingerprints and the fingerprints are combined with the values from the measurement unit to store a pose estimate. Pose estimates at different times are compared to determine drift of the measurement unit. A measurement unit filter is adjusted to correct for the drift.

20 Claims, 10 Drawing Sheets

(51) Int. Cl.
*G02B 27/01* (2006.01)
*G06V 20/64* (2022.01)
*G06F 18/25* (2023.01)

(52) U.S. Cl.
CPC ......... *G02B 27/0172* (2013.01); *G06F 18/25* (2023.01); *G06V 20/653* (2022.01)

(58) Field of Classification Search
CPC .... G01S 13/587; G01S 13/588; G01S 13/726; G01S 13/867; G01S 13/874; G01S 13/89; G01S 7/2883; G01S 7/356; G02B 2027/0138; G02B 27/0093; G02B 27/017; G02B 27/0172; G06F 18/25; G06F 3/011; G06F 3/012; G06V 20/653
See application file for complete search history.

(56) References Cited

U.S. PATENT DOCUMENTS

| | | |
|---|---|---|
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,689,669 A | 11/1997 | Lynch |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,002,853 A | 12/1999 | De Hond |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,079,982 A | 6/2000 | Meader |
| 6,117,923 A | 9/2000 | Amagai et al. |
| 6,119,147 A | 9/2000 | Toomey et al. |
| 6,124,977 A | 9/2000 | Takahashi |
| 6,179,619 B1 | 1/2001 | Tanaka |
| 6,191,809 B1 | 2/2001 | Hori et al. |
| 6,219,045 B1 | 4/2001 | Leahy et al. |
| 6,243,091 B1 | 6/2001 | Berstis |
| 6,271,843 B1 | 8/2001 | Lection et al. |
| 6,362,817 B1 | 3/2002 | Powers et al. |
| 6,375,369 B1 | 4/2002 | Schneider et al. |
| 6,385,735 B1 | 5/2002 | Wilson |
| 6,396,522 B1 | 5/2002 | Vu |
| 6,414,679 B1 | 7/2002 | Miodonski et al. |
| 6,538,655 B1 | 3/2003 | Kubota |
| 6,541,736 B1 | 4/2003 | Huang et al. |
| 6,570,563 B1 | 5/2003 | Honda |
| 6,573,903 B2 | 6/2003 | Gantt |
| 6,590,593 B1 | 7/2003 | Robertson et al. |
| 6,621,508 B1 | 9/2003 | Shiraishi et al. |
| 6,690,393 B2 | 2/2004 | Heron et al. |
| 6,757,068 B2 | 6/2004 | Foxlin |
| 6,784,901 B1 | 8/2004 | Harvfey et al. |
| 6,961,055 B2 | 11/2005 | Doak |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr. |
| 7,119,819 B1 | 10/2006 | Robertson et al. |
| 7,219,245 B1 | 5/2007 | Raghuvanshi |
| 7,382,288 B1 | 6/2008 | Wilson |
| 7,414,629 B2 | 8/2008 | Santodomingo |
| 7,431,453 B2 | 10/2008 | Hogan |
| 7,467,356 B2 | 12/2008 | Gettman et al. |
| 7,542,040 B2 | 6/2009 | Templeman |
| 7,573,640 B2 | 8/2009 | Nivon et al. |
| 7,653,877 B2 | 1/2010 | Matsuda |
| 7,663,625 B2 | 2/2010 | Chartier et al. |
| 7,724,980 B1 | 5/2010 | Shenzhi |
| 7,746,343 B1 | 6/2010 | Charaniya et al. |
| 7,751,662 B2 | 7/2010 | Kleemann |
| 7,758,185 B2 | 7/2010 | Lewis |
| 7,788,323 B2 | 8/2010 | Greenstein et al. |
| 7,804,507 B2 | 9/2010 | Yang et al. |
| 7,814,429 B2 | 10/2010 | Buffet et al. |
| 7,817,150 B2 | 10/2010 | Reichard et al. |
| 7,844,724 B2 | 11/2010 | Van Wie et al. |
| 8,060,759 B1 | 11/2011 | Arnan et al. |
| 8,120,851 B2 | 2/2012 | Iwasa |
| 8,214,660 B2 | 7/2012 | Capps, Jr. |
| 8,246,408 B2 | 8/2012 | Elliot |
| 8,353,594 B2 | 1/2013 | Lewis |
| 8,360,578 B2 | 1/2013 | Nummela et al. |
| 8,508,676 B2 | 8/2013 | Silverstein et al. |
| 8,547,638 B2 | 10/2013 | Levola |
| 8,605,764 B1 | 10/2013 | Rothaar et al. |
| 8,619,365 B2 | 12/2013 | Harris et al. |
| 8,696,113 B2 | 4/2014 | Lewis |
| 8,698,701 B2 | 4/2014 | Margulis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,086,537 B2 | 7/2015 | Iwasa et al. |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 | 7/2016 | Geisner et al. |
| 9,489,027 B1 | 11/2016 | Ogletree |
| 9,519,305 B2 | 12/2016 | Wolfe |
| 9,581,820 B2 | 2/2017 | Robbins |
| 9,582,060 B2 | 2/2017 | Balatsos |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,918,058 B2 | 3/2018 | Takahasi et al. |
| 9,955,862 B2 | 5/2018 | Freeman et al. |
| 9,978,118 B1 | 5/2018 | Ozgumer et al. |
| 9,996,797 B1 | 6/2018 | Holz et al. |
| 10,018,844 B2 | 7/2018 | Levola et al. |
| 10,082,865 B1 | 9/2018 | Raynal et al. |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1 | 12/2019 | Gibson et al. |
| 10,551,879 B1 | 2/2020 | Richards et al. |
| 10,578,870 B2 | 3/2020 | Kimmel |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 | 11/2021 | Brook et al. |
| 11,209,656 B1 | 12/2021 | Choi et al. |
| 11,236,993 B1 | 2/2022 | Hall et al. |
| 2001/0010598 A1 | 8/2001 | Aritake et al. |
| 2001/0018667 A1 | 8/2001 | Kim |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |

(56) References Cited

U.S. PATENT DOCUMENTS

| | | |
|---|---|---|
| 2002/0095463 A1 | 7/2002 | Matsuda |
| 2002/0113820 A1 | 8/2002 | Robinson et al. |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0113887 A1 | 6/2004 | Pair et al. |
| 2004/0174496 A1 | 9/2004 | Ji et al. |
| 2004/0186902 A1 | 9/2004 | Stewart |
| 2004/0193441 A1 | 9/2004 | Altieri |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0093719 A1 | 5/2005 | Okamoto et al. |
| 2005/0128212 A1 | 6/2005 | Edecker et al. |
| 2005/0157159 A1 | 7/2005 | Komiya et al. |
| 2005/0177385 A1 | 8/2005 | Hull |
| 2005/0231599 A1 | 10/2005 | Yamasaki |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0030429 A1 | 2/2008 | Hailpern |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0125218 A1 | 5/2008 | Collins |
| 2008/0146942 A1 | 6/2008 | Dala-Krishna |
| 2008/0173036 A1 | 7/2008 | Williams |
| 2008/0177506 A1 | 7/2008 | Kim |
| 2008/0205838 A1 | 8/2008 | Crippa et al. |
| 2008/0215907 A1 | 9/2008 | Wilson |
| 2008/0225393 A1 | 9/2008 | Rinko |
| 2008/0235570 A1 | 9/2008 | Sawada et al. |
| 2008/0246693 A1 | 10/2008 | Hailpern et al. |
| 2008/0316768 A1 | 12/2008 | Travis |
| 2009/0076791 A1 | 3/2009 | Rhoades et al. |
| 2009/0091583 A1 | 4/2009 | McCoy |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0287728 A1 | 11/2009 | Martine et al. |
| 2009/0300528 A1 | 12/2009 | Stambaugh |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0070378 A1 | 3/2010 | Trotman et al. |
| 2010/0079841 A1 | 4/2010 | Levola |
| 2010/0115428 A1 | 5/2010 | Shuping et al. |
| 2010/0153934 A1 | 6/2010 | Lachner |
| 2010/0194632 A1 | 8/2010 | Raento et al. |
| 2010/0205541 A1 | 8/2010 | Rappaport et al. |
| 2010/0214284 A1 | 8/2010 | Rieffel et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0274567 A1 | 10/2010 | Carlson et al. |
| 2010/0274627 A1 | 10/2010 | Carlson |
| 2010/0277803 A1 | 11/2010 | Pockett et al. |
| 2010/0284085 A1 | 11/2010 | Laakkonen |
| 2010/0296163 A1 | 11/2010 | Sarikko |
| 2011/0010636 A1 | 1/2011 | Hamilton, II et al. |
| 2011/0021263 A1 | 1/2011 | Anderson et al. |
| 2011/0022870 A1 | 1/2011 | Mcgrane |
| 2011/0041083 A1 | 2/2011 | Gabai et al. |
| 2011/0050640 A1 | 3/2011 | Lundback et al. |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalitq |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0502058 | 2/2013 | Liu et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |

(56) References Cited

U.S. PATENT DOCUMENTS

| | | |
|---|---|---|
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0313228 A1 | 10/2014 | Kasahara |
| 2014/0340449 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0123745 A1 | 5/2016 | Cotier et al. |
| 2016/0139402 A1 | 5/2016 | Lapstun |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214907 A1 | 7/2017 | Lapstun |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Lin et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0363871 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirler et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0218545 A1 | 8/2018 | Garcia et al. |
| 2018/0250589 A1 | 9/2018 | Cossairt et al. |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Araujo et al. |

(56) References Cited

U.S. PATENT DOCUMENTS

| | | | |
|---|---|---|---|
| 2019/0011691 A1 | 1/2019 | Peyman | |
| 2019/0056591 A1 | 2/2019 | Tervo et al. | |
| 2019/0087015 A1 | 3/2019 | Lam et al. | |
| 2019/0101758 A1 | 4/2019 | Zhu et al. | |
| 2019/0107723 A1 | 4/2019 | Lee et al. | |
| 2019/0137788 A1 | 5/2019 | Suen | |
| 2019/0155034 A1 | 5/2019 | Singer et al. | |
| 2019/0155439 A1 | 5/2019 | Mukherjee et al. | |
| 2019/0158926 A1 | 5/2019 | Kang et al. | |
| 2019/0162950 A1 | 5/2019 | Lapstun | |
| 2019/0167095 A1 | 6/2019 | Krueger | |
| 2019/0172216 A1 | 6/2019 | Ninan et al. | |
| 2019/0178654 A1 | 6/2019 | Hare | |
| 2019/0182415 A1* | 6/2019 | Sivan | G06F 3/013 |
| 2019/0196690 A1 | 6/2019 | Chong et al. | |
| 2019/0206116 A1 | 7/2019 | Xu et al. | |
| 2019/0219815 A1 | 7/2019 | Price et al. | |
| 2019/0243123 A1 | 8/2019 | Bohn | |
| 2019/0287270 A1 | 9/2019 | Nakamura et al. | |
| 2019/0318502 A1 | 10/2019 | He et al. | |
| 2019/0318540 A1 | 10/2019 | Piemonte et al. | |
| 2019/0321728 A1 | 10/2019 | Imai et al. | |
| 2019/0347853 A1 | 11/2019 | Chen et al. | |
| 2019/0380792 A1 | 12/2019 | Poltaretskyi et al. | |
| 2019/0388182 A1 | 12/2019 | Kumar et al. | |
| 2020/0066045 A1 | 2/2020 | Stahl et al. | |
| 2020/0098188 A1 | 3/2020 | Bar-Zeev et al. | |
| 2020/0100057 A1 | 3/2020 | Galon et al. | |
| 2020/0110928 A1 | 4/2020 | Al Jazaery et al. | |
| 2020/0117267 A1 | 4/2020 | Gibson et al. | |
| 2020/0117270 A1 | 4/2020 | Gibson et al. | |
| 2020/0184217 A1 | 6/2020 | Faulkner | |
| 2020/0184653 A1 | 6/2020 | Faulker | |
| 2020/0202759 A1 | 6/2020 | Ukai et al. | |
| 2020/0242848 A1 | 7/2020 | Ambler et al. | |
| 2020/0309944 A1 | 10/2020 | Thoresen et al. | |
| 2020/0356161 A1 | 11/2020 | Wagner | |
| 2020/0368616 A1 | 11/2020 | Delamont | |
| 2020/0391115 A1 | 12/2020 | Leeper et al. | |
| 2020/0409528 A1 | 12/2020 | Lee | |
| 2021/0008413 A1 | 1/2021 | Asikainen et al. | |
| 2021/0033871 A1 | 2/2021 | Jacoby et al. | |
| 2021/0041951 A1 | 2/2021 | Gibson et al. | |
| 2021/0053820 A1 | 2/2021 | Gurin et al. | |
| 2021/0093391 A1 | 4/2021 | Poltaretskyi et al. | |
| 2021/0093410 A1 | 4/2021 | Gaborit et al. | |
| 2021/0093414 A1 | 4/2021 | Moore et al. | |
| 2021/0097886 A1 | 4/2021 | Kuester et al. | |
| 2021/0132380 A1 | 5/2021 | Wieczorek | |
| 2021/0142582 A1 | 5/2021 | Jones et al. | |
| 2021/0158627 A1 | 5/2021 | Cossairt et al. | |
| 2021/0173480 A1 | 6/2021 | Osterhout et al. | |
| 2022/0366598 A1 | 11/2022 | Azimi et al. | |

FOREIGN PATENT DOCUMENTS

| | | |
|---|---|---|
| CN | 104603675 A | 5/2015 |
| CN | 106662754 A | 5/2017 |
| CN | 107683497 A1 | 2/2018 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 A | 6/2006 |
| JP | H03-036974 U | 4/1991 |
| JP | H10-333094 A | 12/1998 |
| JP | 2002-529806 | 9/2002 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2005-303843 A | 10/2005 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2010-014443 A | 1/2010 |
| JP | 2011-033993 A | 2/2011 |
| JP | 2011-257203 A | 12/2011 |
| JP | 2012-015774 A | 1/2012 |
| JP | 2012-235036 A | 11/2012 |
| JP | 2013-525872 A1 | 6/2013 |
| JP | 2014-500522 A | 1/2014 |
| JP | 2014-192550 A | 10/2014 |
| JP | 2015-191032 A | 11/2015 |
| JP | 2016-502120 A | 1/2016 |
| JP | 2016-85463 A | 5/2016 |
| JP | 2016-516227 A | 6/2016 |
| JP | 2017-015697 A | 1/2017 |
| JP | 2017-153498 | 9/2017 |
| JP | 2017-531840 A | 10/2017 |
| JP | 6232763 B2 | 11/2017 |
| JP | 6333965 B2 | 5/2018 |
| KR | 2005-0010775 A | 1/2005 |
| KR | 10-2006-0059992 A | 6/2006 |
| KR | 10-1372623 B1 | 3/2014 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007/037089 A1 | 5/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2014203440 A1 | 12/2010 |
| WO | 2012030787 A2 | 3/2012 |
| WO | 2013/049012 A1 | 4/2013 |
| WO | 2013062701 A1 | 5/2013 |
| WO | 2014033306 A1 | 3/2014 |
| WO | 2015/143641 A1 | 10/2015 |
| WO | 2015143641 A1 | 10/2015 |
| WO | 2016/054092 A1 | 4/2016 |
| WO | 2017004695 A1 | 1/2017 |
| WO | 2017044761 A1 | 3/2017 |
| WO | 2017049163 A1 | 3/2017 |
| WO | 2017120475 A1 | 7/2017 |
| WO | 2017176861 A1 | 10/2017 |
| WO | 2017/203201 A1 | 11/2017 |
| WO | 2018008232 A1 | 1/2018 |
| WO | 2018/031261 A1 | 2/2018 |
| WO | 2018022523 A1 | 2/2018 |
| WO | 2018/044537 A1 | 3/2018 |
| WO | 2018039273 A1 | 3/2018 |
| WO | 2018057564 A1 | 3/2018 |
| WO | 2018085287 A1 | 5/2018 |
| WO | 2018087408 A1 | 5/2018 |
| WO | 2018097831 A1 | 5/2018 |
| WO | 2018166921 A1 | 9/2018 |
| WO | 2019148154 A1 | 8/2019 |
| WO | 2020010226 A1 | 1/2020 |

(56) References Cited

OTHER PUBLICATIONS

"Extended European Search Report dated Dec. 14, 2022", European Patent Application No. 20886547.7, (8 pages).
"Final Office Action dated Dec. 29, 2022", U.S. Appl. No. 17/098,059, (32 pages).
"First Office Action dated Dec. 22, 2022 with English translation", Chinese Patent Application No. 201980061450.2, (11 pages).
"First Office Action dated Jan. 24, 2023 with English translation", Japanese Patent Application No. 2020-549034, (7 pages).
"Non Final Office Action dated Dec. 7, 2022", U.S. Appl. No. 17/357,795, (63 pages).
"Non Final Office Action dated Feb. 3, 2023", U.S. Appl. No. 17/429,100, (16 pages).
"Non Final Office Action dated Feb. 3, 2023", U.S. Appl. No. 17/497,965, (32 pages).
"Non Final Office Action dated Jan. 24, 2023", U.S. Appl. No. 17/497,940, (10 pages).
"Non Final Office Action dated Mar. 1, 2023", U.S. Appl. No. 18/046,739, (34 pages).
"Office Action dated Nov. 24, 2022 with English Translation", Japanese Patent Application No. 2020-533730, (11 pages).
Molchanov, Pavlo et al., "Short-range FMCW monopulse radar for hand-gesture sensing", 2015 IEEE Radar Conference (RadarCon) (2015), pp. 1491-1496.
Communication Pursuant to Article 94(3) EPC dated Jan. 4, 2022, European Patent Application No. 20154070.5, (8 pages).
Communication Pursuant to Article 94(3) EPC dated Oct. 21, 2021, European Patent Application No. 16207441.3, (4 pages).
Communication Pursuant to Rule 164(1) EPC dated Jul. 27, 2021, European Patent Application No. 19833664.6, (11 pages).
Extended European Search Report dated Jun. 30, 2021, European Patent Application No. 19811971.1, (9 pages).
Extended European Search Report dated Jan. 4, 2022, European Patent Application No. 19815085.6, (9 pages).
Extended European Search Report dated Jul. 16, 2021, European Patent Application No. 19810142.0, (14 pages).
Extended European Search Report dated Jul. 30, 2021, European Patent Application No. 19839970.1, (7 pages).
Extended European Search Report dated Oct. 27, 2021, European Patent Application No. 19833664.6, (10 pages).
Extended European Search Report dated Sep. 20, 2021, European Patent Application No. 19851373.1, (8 pages).
Extended European Search Report dated Sep. 28, 2021, European Patent Application No. 19845418.3, (13 pages).
Final Office Action dated Jun. 15, 2021, U.S. Appl. No. 16/928,313, (42 pages).
Final Office Action dated Sep. 17, 2021, U.S. Appl. No. 16/938,782, (44 pages).
Multi-core processor, TechTarget, 2013, (1 page).
Non Final Office Action dated Aug. 4, 2021, U.S. Appl. No. 16/864,721, (51 pages).
Non Final Office Action dated Jul. 9, 2021, U.S. Appl. No. 17/002,663, (43 pages).
Non Final Office Action dated Jul. 9, 2021, U.S. Appl. No. 16/833,093, (47 pages).
Non Final Office Action dated Jun. 10, 2021, U.S. Appl. No. 16/938,782, (40 Pages).
Non Final Office Action dated Jun. 29, 2021, U.S. Appl. No. 16/698,588, (58 pages).
Non Final Office Action dated May 26, 2021, U.S. Appl. No. 16/214,575, (19 pages).
Non Final Office Action dated Sep. 20, 2021, U.S. Appl. No. 17/105,848, (56 pages).
Non Final Office Action dated Sep. 29, 202, U.S. Appl. No. 16/748,193, (62 pages).
Giuseppe, Donato, et al., Stereoscopic helmet mounted system for real time 3D environment reconstruction and indoor ego—motion estimation, Proc. SPIE 6955, Head- and Helmet-Mounted Displays XIII: Design and Applications, 69550P.

Mrad, et al., A framework for System Level Low Power Design Space Exploration, 1991.
Sheng, Liu, et al., Time-multiplexed dual-focal plane head-mounted display with a liquid lens, Optics Letters, Optical Society of Amer i ca, US, vol. 34, No. 11, Jun. 1, 2009 (Jun. 1, 2009), XP001524475, ISSN: 0146-9592, pp. 1642-1644.
"Extended European Search Report dated Aug. 24, 2022", European Patent Application No. 20846338.0, (13 pages).
"Extended European Search Report dated Aug. 8, 2022", European Patent Application No. 19898874.3, (8 pages).
"Extended European Search Report dated Sep. 8, 2022", European Patent Application No. 20798769.4, (13 pages).
"Extended European Search Report dated Nov. 3, 2022", European Patent Application No. 20770244.0, (23 pages).
"First Examination Report dated Jul. 27, 2022", Chinese Patent Application No. 201980036675.2, (5 pages).
"First Examination Report dated Jul. 28, 2022", Indian Patent Application No. 202047024232, (6 pages).
"First Office Action dated Sep. 16, 2022 with English translation", Chinese Patent Application No. 201980063642.7, (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action dated Jul. 26, 2022", U.S. Appl. No. 17/098,059, (28 pages).
"Non Final Office Action dated Sep. 19, 2022", U.S. Appl. No. 17/263,001, (14 pages).
"Notice of Reason for Rejection dated Oct. 28, 2022 with English translation", Japanese Patent Application No. 2020-531452, (3 pages).
"Second Office Action dated Jul. 13, 2022 with English Translation", Chinese Patent Application No. 201880079474.6, (10 pages).
"Second Office Action dated Jun. 20, 2022 with English Translation", Chinese Patent Application No. 201880089255.6, (14 pages).
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).
Chittineni, C., et al., "Single filters for combined image geometric manipulation and enhancement", Proceedings of SPIE vol. 1903, Image and Video Processing, Apr. 8, 1993, San Jose, CA. (Year 1993), pp. 111-121.
Communication according to Rule 164(1) EPC dated Feb. 23, 2022, European Patent Application No. 20753144.3, (11 pages).
Extended European Search Report dated Jan. 28, 2022, European Patent Application No. 19815876.8, (9 pages).
Extended European Search Report dated Jun. 19, 2020, European Patent Application No. 20154750.2, (10 pages).
Extended European Search Report dated Mar. 22, 2022, European Patent Application No. 19843487.0, (14 pages).
Final Office Action dated Feb. 23, 2022, U.S. Appl. No. 16/748,193, (23 pages).
Final Office Action dated Feb. 3, 2022, U.S. Appl. No. 16/864,721, (36 pages).
First Office Action dated Mar. 14, 2022 with English translation, Chinese Patent Application No. 201880079474.6, (11 pages).
Non Final Office Action dated Apr. 1, 2022, U.S. Appl. No. 17/256,961, (65 pages).
Non Final Office Action dated Apr. 11, 2022, U.S. Appl. No. 16/938,782, (52 pages).
Non Final Office Action dated Apr. 12, 2022, U.S. Appl. No. 17/262,991, (60 pages).
Non Final Office Action dated Feb. 2, 2022, U.S. Appl. No. 16/783,866, (8 pages).
Non Final Office Action dated Mar. 31, 2022, U.S. Appl. No. 17/257,814, (60 pages).
Non Final Office Action dated Mar. 9, 2022, U.S. Appl. No. 16/870,676, (57 pages).
"Communication Pursuant to Article 94(3) EPC dated Apr. 25, 2022", European Patent Application No. 18885707.2, (5 pages).

(56) References Cited

OTHER PUBLICATIONS

"Communication Pursuant to Article 94(3) EPC dated May 30, 2022", European Patent Application No. 19768418.6, (6 pages).
"Extended European Search Report dated May 16, 2022", European Patent Application No. 19871001.4, (9 pages).
"Extended European Search Report dated May 30, 2022", European Patent Application No. 20753144.3, (10 pages).
"Final Office Action dated Jul. 13, 2022", U.S. Appl. No. 17/262,991, (18 pages).
"First Examination Report dated May 13, 2022", Indian Patent Application No. 202047026359, (8 pages).
"Non Final Office Action dated May 10, 2022", U.S. Appl. No. 17/140,921, (25 pages).
"Non Final Office Action dated May 17, 2022", U.S. Appl. No. 16/748,193, (11 pages).
Extended European Search Report dated Jan. 22, 2021, European Patent Application No. 18890390.0, (11 pages).
Extended European Search Report dated Mar. 4, 2021, European Patent Application No. 19768418.6, (9 pages).
Final Office Action dated Mar. 1, 2021, U.S. Appl. No. 16/214,575, (29 pages).
Final Office Action dated Mar. 19, 2021, U.S. Appl. No. 16/530,776, (25 pages).
International Search Report and Written Opinion dated Feb. 12, 2021, International Application No. PCT/US20/60555, (25 pages).
International Search Report and Written Opinion dated Feb. 2, 2021, International PCT Patent Application No. PCT/US20/60550, (9 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Mar. 3, 2021, U.S. Appl. No. 16/427,337, (41 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract, pp. 1-6 and 9.
Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document, pp. 253-260.
Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763 >, entire document.
"Extended European Search Report dated Apr. 5, 2023", European Patent Application No. 20888716.6, (11 pages).
"Final Office Action dated Mar. 10, 2023", U.S. Appl. No. 17/357,795, (15 pages).
"First Office Action dated Apr. 21, 2023 with English translation", Japanese Patent Application No. 2021-509779, (26 pages).
"First Office Action dated Apr. 13, 2023 with English Translation", Japanese Patent Application No. 2020-567766, (7 pages).
"First Office Action dated Jan. 30, 2023 with English translation", Chinese Patent Application No. 201980082951.9, (5 pages).
"First Office Action dated Mar. 27, 2023 with English translation", Japanese Patent Application No. 2020-566617, (6 pages).
"First Office Action dated Mar. 6, 2023 with English translation", Korean Patent Application No. 10-2020-7019685, (7 pages).
"Non Final Office Action dated Apr. 13, 2023", U.S. Appl. No. 17/098,043, (7 pages).
"Non Final Office Action dated May 11, 2023", U.S. Appl. No. 17/822,279, (24 pages).
"Office Action dated Apr. 13, 2023 with English translation", Japanese Patent Application No. 2020-533730, (13 pages).
"Office Action dated Mar. 30, 2023 with English translation", Japanese Patent Application No. 2020-566620, (10 pages).
"Second Office Action dated May 2, 2023 with English Translation", Japanese Patent Application No. 2020-549034, (6 pages).
Li, Yujia , et al., "Graph Matching Networks for Learning the Similarity of Graph Structured Objects", arxiv.org, Cornell University Library, 201 Olin Library Cornell University Ithaca, NY 14853, XP081268608, Apr. 29, 2019.
Luo, Zixin , et al., "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], Jun. 15, 2019, pp. 2522-2531.
Zhang, Zen , et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], Oct. 27, 2019, pp. 5086-5095.
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Communication Pursuant to Article 94(3) EPC dated Sep. 4, 2019, European Patent Application No. 10793707.0, (4 pages).
Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jun. 12, 2017, European Patent Application No. 16207441.3, (8 pages).
Final Office Action dated Aug. 10, 2020, U.S. Appl. No. 16/225,961, (13 pages).
Final Office Action dated Aug. 24, 2020, U.S. Appl. No. 16/435,933, (44 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).

(56) References Cited

OTHER PUBLICATIONS

International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Sep. 24, 2020, International Patent Application No. PCT/US2020/043596, (3 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
Non Final Office Action dated Nov. 19. 2019, U.S. Appl. No. 16/355,611, (31 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Nov. 5, 2020, U.S. Appl. No. 16/530,776, (45 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Notice of Allowance dated Mar. 25, 2020, U.S. Appl. No. 15/564,517, (11 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
"Phototourism Challenge", CVPR 2019 Image Matching Workshop. https://image matching-workshop. github.io., (16 pages).
Summons to attend oral proceedings pursuant to Rule 115(1) EPC mailed on Jul. 15, 2019, European Patent Application No. 15162521. 7, (7 pages).

Aarik, J et al., "Effect of crystal structure on optical properties of TiO2 films grown by atomic layer deposition", Thin Solid Films; Publication (online). May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Arandjelović, Relja et al., "Three things everyone should know to improve object retrieval", CVPR, 2012, (8 pages).
Azom, , "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>, (6 pages).
Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Battaglia, Peter W. et al., "Relational inductive biases, deep learning, and graph networks", arXiv:1806.01261, Oct. 17, 2018, pp. 1-40.
Berg, Alexander C et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Caetano, Tibério S et al., "Learning graph matching", IEEE TPAMI, 31(6):1048-1058, 2009.
Cech, Jan et al., "Efficient sequential correspondence selection by cosegmentation", IEEE TPAMI, 32(9):1568-1581, Sep. 2010.
Cuturi, Marco , "Sinkhorn distances: Lightspeed computation of optimal transport", NIPS, 2013, (9 pages).
Dai, Angela et al., "ScanNet: Richly-annotated 3d reconstructions of indoor scenes", In CVPR, arXiv:1702.04405v2 [cs.CV] Apr. 11, 2017, (22 pages).
Deng, Haowen et al., "PPFnet: Global context aware local features for robust 3d point matching", In CVPR, arXiv:1802.02669v2 [cs.CV] Mar. 1, 2018, (12 pages).
Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai et al., "D2-net: A trainable CNN for joint detection and description of local features", CVPR, arXiv:1905.03561v1 [cs.CV] May 9, 2019, (16 pages).
Ebel, Patrick et al., "Beyond cartesian representations for local descriptors", ICCV, arXiv:1908.05547v1 [cs.CV] Aug. 15, 2019, (11 pages).
Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv:1704.01212v2 [cs.LG] Jun. 12, 2017, (14 pages).
Goodfellow, , "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>, (9 pages).

(56) References Cited

OTHER PUBLICATIONS

Hartley, Richard et al., "Multiple View Geometry in Computer Vision", Cambridge University Press, 2003, pp. 1-673.
Jacob, Robert J. , "Eye Tracking in Advanced Interface Design", Human-Computer Interaction Lab, Naval Research Laboratory, Washington, D.C., date unknown. 2003, pp. 1-50.
Lee, Juho et al., "Set transformer: A frame-work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Levola, T. , "Diffractive Optics for Virtual Reality Displays", Journal of the SID EuroDisplay 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Li, Yujia et al., "Graph matching networks for learning the similarity of graph structured objects", ICML, arXiv:1904.12787v2 [cs.LG] May 12, 2019, (18 pages).
Li, Zhengqi et al., "Megadepth: Learning single- view depth prediction from internet photos", In CVPR, fromarXiv: 1804.00607v4 [cs.CV] Nov. 28, 2018, (10 pages).
Loiola, Eliane M. et al., "A survey for the quadratic assignment problem", European journal of operational research, 176(2): 2007, pp. 657-690.
Lowe, David G. , "Distinctive image features from scale-invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop201700002.pdf>; DOI: 10.1051/epjconf/201713900002, (8 pages).
Munkres, James , "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).
Rocco, Ignacio et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages.).
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).
Sinkhorn, Richard et al., "Concerning nonnegative matrices and doubly stochastic matrices.", Pacific Journal of Mathematics, 1967, pp. 343-348.
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http:/fkohl .chbe.gatech.edu/sites/default/files/linked_files/publications/2011Decomposition%20of%20poly(propylene%20carbonate)%20with%20UV%20sensitive%20iodonium%20salts,pdf>; DOI: 10, 1016/j.polymdegradstab.2010, 12.003, (17 pages).
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar et al., "Graph attention networks", ICLR, arXiv:1710.10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711.07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.

(56) References Cited

OTHER PUBLICATIONS

Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v2 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui et al., "Learning two-view correspondences and geometry using order-aware network", ICCV; aarXiv:1908.04964v1 [cs.CV] Aug. 14, 2019, (11 pages).
Zhang, Li et al., "Dual graph convolutional net- work for semantic segmentation", BMVC, 2019; arXiv:1909.06121v3 [cs.CV] Aug. 26, 2020, (18 pages).
European Search Report dated Oct. 15, 2020, European Patent Application No. 20180623.9, (10 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
International Search Report and Written Opinion dated Dec. 3, 2020, International Patent Application No. PCT/US20/43596, (25 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http://lcdcl.umd.edu/papers/icra2012.pdf> entire document, (8 pages).
"Communication Pursuant to Article 94(3) EPC dated May 23, 2023", European Patent Application No. 18890390.0, (5 pages).
"First Examination Report dated Aug. 8, 2023", Australian Patent Application No. 2018379105, (3 pages).
"First Office Action dated Jul. 4, 2023 with English translation", Japanese Patent Application No. 2021-505669, (6 pages).
"First Office Action dated Jun. 13, 2023 with English translation", Japanese Patent Application No. 2020-567853, (7 pages).
"First Office Action dated May 26, 2023 with English translation", Japanese Patent Application No. 2021-500607, (6 pages).
"First Office Action dated May 30, 2023 with English translation", Japanese Patent Application No. 2021-519873, (8 pages).
"Non Final Office Action dated Aug. 2, 2023", U.S. Appl. No. 17/807,600, (25 pages).
"Non Final Office Action dated Jul. 20, 2023", U.S. Appl. No. 17/650,188, (11 pages).
"Non Final Office Action dated Jun. 14, 2023", U.S. Appl. No. 17/516,483, (10 pages).
"Notice of Allowance dated Jul. 27, 2023 with English translation", Korean Patent Application No. 10-2020-7019685, (4 pages).
"Office Action dated Jul. 20, 2023 with English translation", Japanese Patent Application No. 2021-505884, (6 pages).
"Office Action dated Jun. 8, 2023 with English translation", Japanese Patent Application No. 2021-503762, (6 pages).

\* cited by examiner

RADAR HEAD POSE LOCALIZATION

CROSS-REFERENCE TO RELATED APPLICATIONS

This application is a National Phase of International Application No. PCT/US2019/033987, filed on May 24, 2019, which claims priority from U.S. Provisional Patent Application No. 62/678,621, filed on May 31, 2018, all of which is incorporated herein by reference in its entirety.

BACKGROUND OF THE INVENTION

1). Field of the Invention

This invention relates to an augmented reality device and to a method of displaying rendered content.

2). Discussion of Related Art

Modern computing and display technologies have facilitated development of visual perception devices such as "virtual reality" viewing devices. A virtual reality viewing device may be a wearable device that presents the user with two images, one for the left eye and one for the right eye. Objects in the images may differ from one another in a manner that allows the brain to process the objects as a three-dimensional object. When the images constantly change, movement in three-dimensions can be simulated. A virtual reality viewing device typically involves presentation of digital or virtual image information without transparency to other real-world objects.

Other visual perception devices, so called "augmented reality" viewing devices usually include technology that allows for the presentation of digital and virtual image information as an augmentation to visualization of the actual world around the user. An augmented reality viewing device may, for example, have one or more transparent eyepieces that allow the user to see real world objects behind the eyepieces. Such an eyepiece can serve as a wave guide through which laser light propagates from a laser projector towards an eye of the user. A laser light pattern created by the projector becomes visible on the retina of the eye. The retina of the eye then receives light from the real-world objects behind the eyepiece and laser light from the projector. Real world objects are thus augmented with image data from the projector, in the perception of the user.

Augmented reality devices often have technology that permit for an object to remain in a stationary position relative to real world objects, as perceived by the user, even if the user would move their head. If the user would, for example, rotate their head to the right, the rendered object has to rotate to the left within the view of the user together with real world objects. Movement of the augmented reality device may be tracked through a measurement device such as an inertial measurement unit (IMU) so that the position of the object can be adjusted via the projector.

SUMMARY OF THE INVENTION

In some embodiments, the invention provides an augmented reality device including a head-mountable frame, a radar system, a measurement unit, measurement unit filter, a sensor fusion module, a rendering module, an eyepiece and a projector. The radar system generates first and second radar maps of locations of real-world objects relative to the user at first and second times in the slow domain. The measurement unit may be secured to the frame and detects first and second measurement values at the first and second times in the slow domain, each measurement value being indicative of a position and movement of the measurement unit. The measurement unit filter may be connected to the measurement unit. The sensor fusion module may be connected to the image processing module and may be operable to (i) determine first and second pose estimates, the first pose estimate being based on the first set of radar fingerprints relative to the first measurement value and the second pose estimate being based on the second set of radar fingerprints relative to the second measurement value, (ii) determine drift of the measurement unit by comparing the first pose estimate with the second pose estimate, and (iii) adjust the measurement unit filter to correct for the drift. The rendering module determines a desired position of a rendered object based on the second pose. The eyepiece may be secured to the frame. The projector may be secured to the frame and may be operable to convert data into light to generate the rendered object and displaying the rendered object in the desired position to the user through the eyepiece.

In some embodiments, the invention also provides another augmented reality device including a head-mountable frame, a radar system, a measurement unit, measurement unit filter, a sensor fusion module, a rendering module, an eyepiece, and a projector. The radar system includes at least a first radar device that has a first radar transmitter secured to the frame and transmitting a radio wave at first and second times in a slow domain and a first radar receiver secured to the frame and detecting the radio waves after the radio waves are reflected from a surface, a radar tracking module connected to the first radar receiver and determining first and second time intervals in a fast domain between the transmission and the detection of the radio waves, respectively, a radar mapping module connected to the radar tracking module and generating first and second radar maps of locations of real-world objects relative to the user based at least on the respective times in the fast domain, an image processing module connected to the radar mapping module and calculating a first and second sets of radar fingerprints based on the locations of the real-world objects in the first and second radar maps, respectively. The measurement unit may be secured to the frame and may detects first and second measurement values at the first and second times in the slow domain, each measurement value being indicative of a position and movement of the measurement unit, a measurement unit filter connected to the measurement unit. The sensor fusion module may be connected to the image processing module and may be operable to (i) determine first and second pose estimates, the first pose estimate being based on the first set of radar fingerprints relative to the first measurement value and the second pose estimate being based on the second set of radar fingerprints relative to the second measurement value, (ii) determine drift of the measurement unit by comparing the first pose estimate with the second pose estimate, and (iii) adjust the measurement unit filter to correct for the drift. The rendering module may determine a desired position of a rendered object based on the second pose. The eyepiece may be secured to the frame. The projector may be secured to the frame and may be operable to convert data into light to generate the rendered object and displaying the rendered object in the desired position to the user through the eyepiece.

In some embodiments, the invention further provides a further augmented reality device including a head-mountable frame, a radar system, a measurement unit, measurement unit filter, a sensor fusion module, a rendering module, an eyepiece, and a projector. The radar system may be secured to the frame and may include a radar transmitter secured to the frame and initiates execution of a first radar cycle by transmitting a first radio wave, a radar receiver secured to the frame and detecting the first radio wave after the first radio wave may be reflected from a surface, a radar tracking module connected to the radar receiver and determining a first time between the transmission and the detection of the first radio wave, a radar mapping module connected to the radar tracking module and generating a first radar map of locations of real-world objects relative to the user based at least on the first time between the transmission and the detection of the first radio wave and an image processing module connected to the radar mapping module and calculating a first set of radar fingerprints based on the locations of the real-world objects in the first radar map to complete the first radar cycle. The measurement unit may be secured to the frame and may detect a first measurement value indicative of a position and movement with a measurement unit that may be secured to the frame. The sensor fusion module is connected to the image processing module. The measurement unit may determine a first pose estimate of the first set of radar fingerprints relative to the first measurement value. The radar system executes a second radar cycle, which may include transmitting a second radio wave, detecting the second radio wave after the second radio wave is reflected from the surface, determining a second time between the transmission and the detection of the second radio wave, generating a second radar map of locations of real-world objects relative to the user based at least on the second time between the transmission and the detection of the second radio wave and calculating a second set of radar fingerprints based on the locations of the real-world objects in the second radar map. The measurement unit detects a second measurement value indicative of a position and movement with the measurement unit secured to the frame. The sensor fusion module may determine a second pose estimate of the second set of radar fingerprints relative to the second measurement value, may determine drift of the measurement unit by comparing the first pose estimate with the second pose estimate, and adjusts a measurement unit filter that may be connected to the measurement unit to correct for the drift. The rendering module may determine a desired position of a rendered object based on the second pose. The eyepiece may be secured to the frame. The projector may be secured to the frame and may be operable to convert data into light to generate the rendered object and displaying the rendered object in the desired position to the user through the eyepiece.

In some embodiments, the invention also provides a method of displaying rendered content. A head-mountable frame may be attached to a head of a user. A plurality of radar cycles may be executed to generate first and second radar maps of locations of real-world objects relative to the user at first and second times in the slow domain. First and second measurement values may be detected at the first and second times in the slow domain, each measurement value being indicative of a position and movement with a measurement unit secured to the frame. A first and second pose estimate may be determined, the first pose estimate being based on the first set of radar fingerprints relative to the first measurement value and the second pose estimate being based on the second set of radar fingerprints relative to the second measurement value. A drift of the measurement unit may be determined by comparing the first pose estimate with the second pose estimate. A measurement unit filter that may be connected to the measurement unit may be adjusted to correct for the drift. A desired position of a rendered object may be determined based on the second pose estimate. Data may be converted into light to generate the rendered object and the rendered object may be displayed in the desired position to the user through an eyepiece secured to the head-mountable frame.

In some embodiments, the invention provides another method of displaying rendered content. A head-mountable frame may be attached to a head of a user. A plurality of radar cycles may be executed, including transmitting a radio wave at a first and second times in a slow domain, detecting the radio waves after the radio waves are reflected from a surface, determining first and second time intervals in a fast domain between the transmission and the detection of the radio waves, respectively, generating first and second radar maps of locations of real-world objects relative to the user based at least on the respective times in the fast domain and calculating first and second sets of radar fingerprints based on the locations of the real-world objects in the first and second radar maps, respectively. A first and second measurement values may be detected at the first and second times in the slow domain, each measurement value being indicative of a position and movement with a measurement unit secured to the frame. First and second pose estimates may be determined, the first pose estimate being based on the first set of radar fingerprints relative to the first measurement value and the second pose estimate being based on the second set of radar fingerprints relative to the second measurement value. Drift of the measurement unit may be determined by comparing the first pose estimate with the second pose estimate, adjusting a measurement unit filter that may be connected to the measurement unit to correct for the drift. A desired position of a rendered object may be determined based on the second pose estimate. Data may be converted into light to generate the rendered object and the rendered object may be displayed in the desired position to the user through an eyepiece secured to the head-mountable frame.

In some embodiments, the invention provides further method of displaying rendered content. A head-mountable frame may be attached to a head of a user. A first radar cycle may be executed that may include transmitting a first radio wave, detecting the first radio wave after the first radio wave is reflected from a surface, determining a first time between the transmission and the detection of the first radio wave, generating a first radar map of locations of real-world objects relative to the user based at least on the first time between the transmission and the detection of the first radio wave and calculating a first set of radar fingerprints based on the locations of the real-world objects in the first radar map, detecting a first measurement value indicative of a position and movement with a measurement unit secured to the frame. A first pose estimate may be determined of the first set of radar fingerprints relative to the first measurement value. A second radar cycle may be executed that may include transmitting a second radio wave, detecting the second radio wave after the second radio wave is reflected from the surface, determining a second time between the transmission and the detection of the second radio wave, generating a second radar map of locations of real-world objects relative to the user based at least on the second time between the transmission and the detection of the second radio wave and calculating a second set of radar fingerprints based on the locations of the real-world objects in the second radar map. A second measurement value may be determined that is indicative of a position and movement with the measurement unit secured to the frame. A second pose estimate may be determined of the second set of radar fingerprints relative to the second measurement value. Drift of the measurement unit may be determined by comparing the first pose estimate with the second pose estimate. A measurement unit filter that may be connected to the measurement unit may be adjusted to correct for the drift. A desired position of a rendered object may be determined based on the second pose estimate. Data may be converted into light to generate the rendered object and the rendered object may be displayed in the desired position to the user through an eyepiece secured to the head-mountable frame.

BRIEF DESCRIPTION OF THE DRAWINGS

The invention is further described by way of example with reference to the accompanying drawings, wherein.

DETAILED DESCRIPTION OF THE INVENTION

An augmented reality device has a radar system that generates radar maps of locations of real world objects. An inertial measurement unit detects measurement values such as acceleration, gravitational force and inclination ranges. The values from the measurement unit drift over time. The radar maps are processed to determine fingerprints and the fingerprints may be combined with the values from the measurement unit to store a pose estimate. Pose estimates at different times may be compared to determine drift of the measurement unit. A measurement unit filter may be adjusted to correct for the drift.

Positive terms such as "is", "are", "have", etc. are preferred herein as opposed to optional terms such as "may be" or "may have", etc. Positive terms are used to comply with the requirements for (i) describing the best mode, (ii) providing a description that enables one of ordinary skill in the art to make the invention and (iii) providing an example. It should however be understood that the specific details that are described using positive terms may be modified without departing from the scope and spirit of the invention as more broadly defined in the claims.

Figure 1:
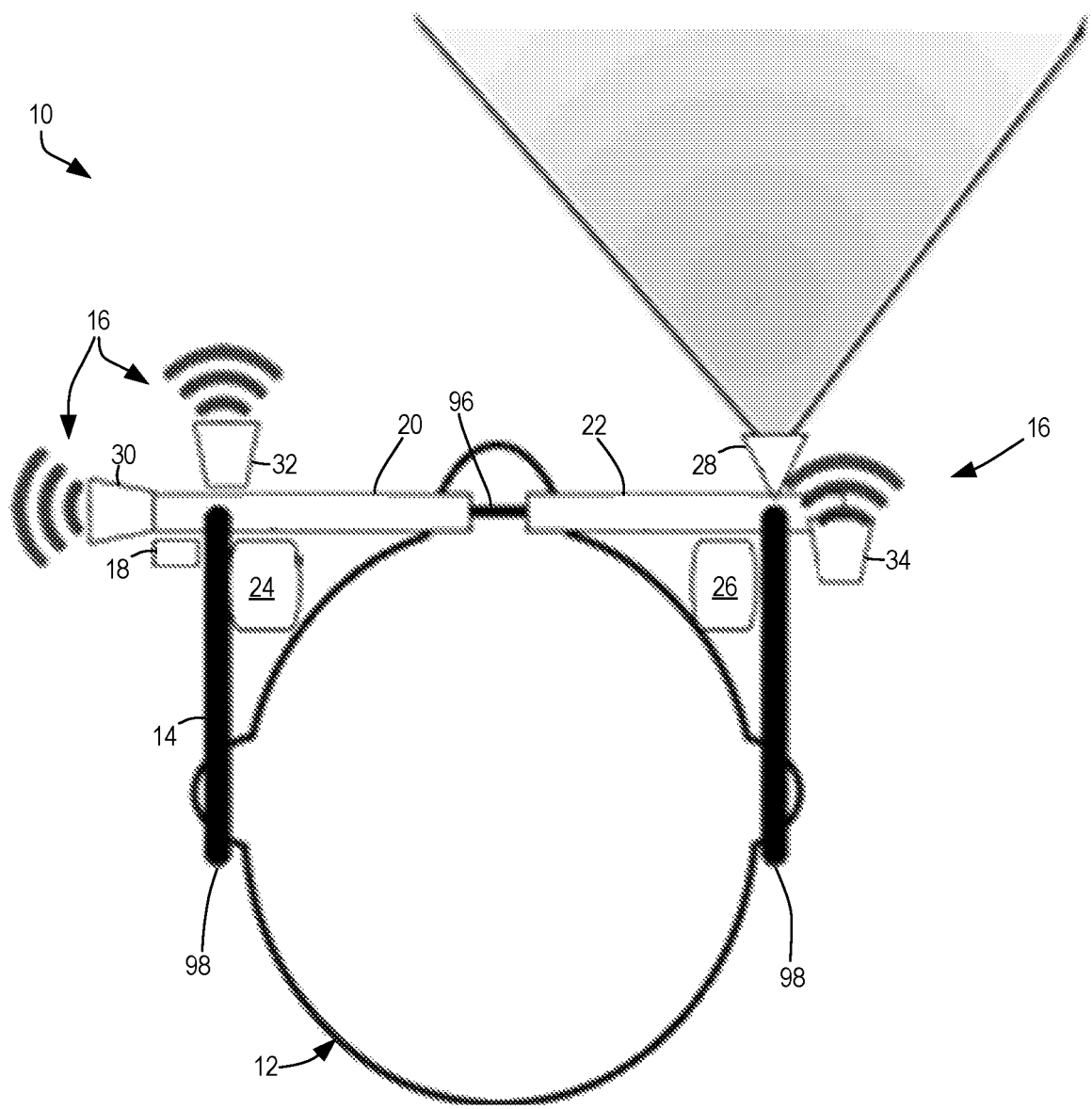
FIG. 1 is a top plan view of an augmented reality device, according to an embodiment of the invention, and a user wearing the augmented reality device.

FIG. 1 illustrates an augmented reality device 10, according to an embodiment of the invention, and a head of a user 12. The augmented reality device 10 may include a head-mountable frame 14, a radar system 16, a measurement unit 18, first and second eyepieces 20 and 22, first and second projectors 24 and 26, and a visual camera 28 that may be mounted to the frame 14.

The radar system 16 may include first, second and third radar devices 30, 32 and 34. Each radar device 30, 32 and 34 may be mounted to the frame 14. Each radar device 30, 32 and 34 has a particular orientation that allows the radar device 30, 32 or 34 to transmit and receive radio waves in a desired direction.

A radar system may comprise one or more antenna for transmitting and/or receiving signals. The radar system may have a chip with a fixed number of antenna fixed to the chip. In order to obtain the desired signal number and/or directionality, more than one chip may be used, and each chip may be placed as needed to direct the signal to the desired location. Alternatively, the radar system may have a single chip with one or more antenna that may be placed in different locations and pointing in different directions in order to obtain the desired radar signals The measurement unit 18 may be an inertial measurement unit (IMU). The measurement unit 18 may include one or more accelerometers, a gyroscope and a magnetometer. As will be commonly understood by one of ordinary skill in the art, an accelerometer measures acceleration, the acceleration may be integrated to determine velocity, and the velocity may be integrated to determine position. The gyroscope may determine changes in angular orientation. The magnetometer may determine the direction of gravitational force and may determine an "attitude" of the measurement unit relative to the direction of gravitational force.

The projectors 24 and 26 may be operable to convert data into light (e.g. laser light, or LED light) and to generate a rendered object. The projectors 24 and 26 may have lasers that are oriented to direct laser light into the eyepieces 20 and 22, respectively. The eyepieces 20 and 22 may be waveguides that may be also transparent.

Each one of the radar devices 30, 32 or 34 has field-of-view of approximately 30° and an operation range of 0.1 to 4 meters. The radar devices 30, 32 and 34 are typically operated to transmit and receive radio waves. The radio waves may be frequency modulated continuous waves. The radio waves may be millimeter-wave radar (e.g. operating in the 60 GHz band). Each radar device 30, 32 and 34 may have more than one transmission (TX) channel (e.g., two TX channels) and more than one reception (RX) channel (e.g., four RX channels) with some channels measuring redundant signal.

The visual camera 28 captures grayscale images and depth maps at approximately 60 Hz. The visual camera 28 has a field-of-view of approximately 90° and an operating range of approximately 1 to 4 meters.

Figure 2:
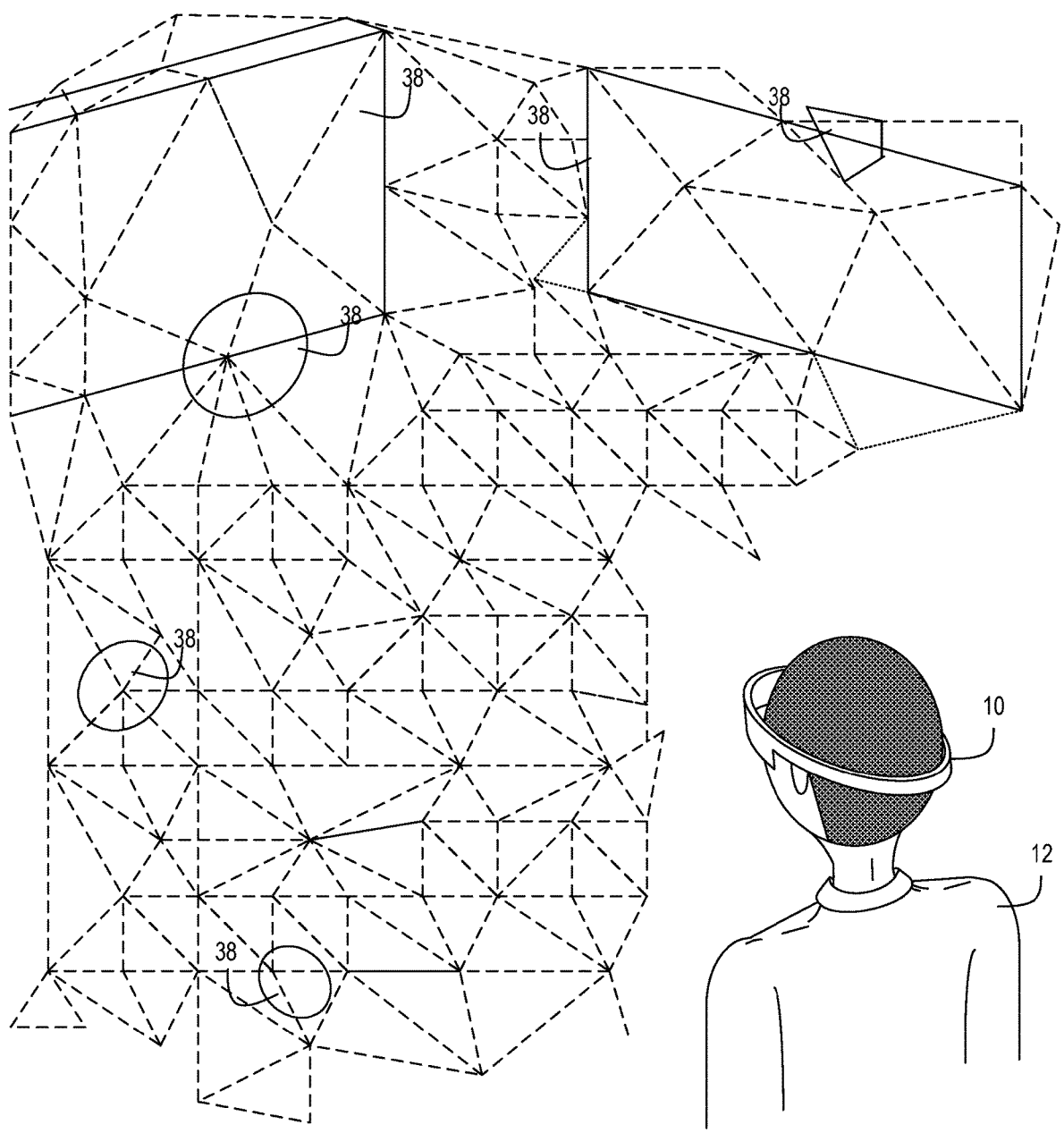
FIG. 2 is a perspective view illustrating the capturing of visual data for purposes of generating a visual map.

FIG. 2 illustrates the use of the visual system in more detail. The visual system captures objects 38 and a depth sensor may determine distances to the object 38 from the augmented reality device 10. The visual camera 28 captures images of the real world objects 38 on a continual basis. The user's head pose and position can be determined by processing imagery from the visual system using a Simultaneous Localization and Mapping (SLAM) and visual odometry procedure. The dashed lines represent further processing of the images on a continual basis. Such continual processing of the images provides data that indicates movement of the augmented reality device 10 relative to the real world objects 38. Because the depth sensor and the gravity sensor determine the locations of the real world objects 38 relative to gravitation force, and the visual camera 28 detects movement of the augmented reality device 10 relative to the real world objects 38, the movement of the augmented reality device 10 relative to gravitation force can also be calculated. Other methods of mapping a three-dimensional environment may be employed, for example using one or more cameras that are located in stationary positions within a room. However, the integration of the depth sensor and the visual system within the augmented reality device 10 provides for a more mobile application.

Figure 3:
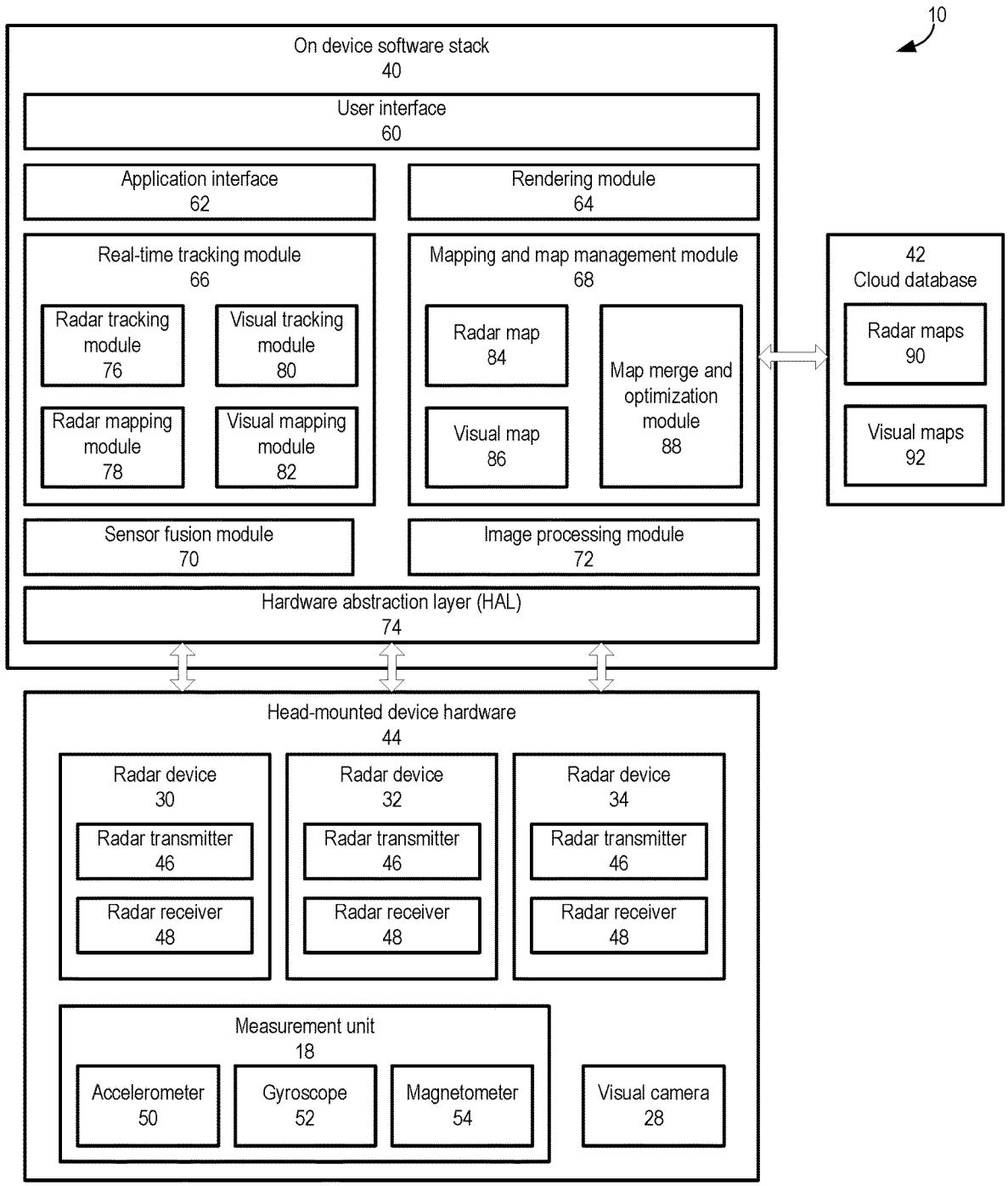
FIG. 3 is a block diagram of further components of the augmented reality device.

As shown in FIG. 3, the augmented reality device 10 may include an on-device software stack 40, a cloud database 42 and head-mounted device hardware 44.

The head-mounted device hardware 44 include the first, second and third radar devices 30, 32 and 34, the measurement unit 18, and the visual camera 28. Each radar device 30, 32 or 34 has a respective radar transmitter 46 and a respective radar receiver 48. The measurement unit 18 may include a number of measurement devices, including an accelerometer 50, a gyroscope 52 and a magnetometer 54.

All the components of the head-mounted device hardware 44 are directly or indirectly mounted to the frame 14 and are therefore stationary relative to the frame 14. The on-device software stack 40 may include a user interface 60, an application interface 62, a rendering module 64, a real-time tracking module 66, a mapping and map management module 68, a sensor fusion module 70, an image processing module 72 and a hardware abstraction layer (HAL) 74.

The real-time tracking module 66 may include a radar tracking module 76, a radar mapping module 78, a visual tracking module 80 and a visual mapping module 82. The mapping and map management module 68 may include at least one radar map 84, a visual map 86, and a map merge and optimization module 88.

The components of the on-device software stack 40 are shown as separate modules. The modules may, however, be connected to one another in the form of calls and subroutines within a computer program. The components of the on-device software stack 40 may be connected through the hardware abstraction layer 74 to components of the head-mounted device hardware 44. Of significance is that the radar tracking module 76 may be connected to the radar transmitters 46 and radar receivers 48 of the radar devices 30, 32 and 34 and that the radar mapping module 78 may be connected to the radar tracking module 76. Of significance also is that the visual tracking module 80 may be connected to the visual camera 28 and the visual mapping module 82 may be connected to the visual tracking module 80.

The radar mapping module 78 creates the radar map 84 and the visual tracking module 80 creates the visual map 86. The image processing module 72 reads the radar map 84 and the visual map 86 to determine features within the maps. Further radar maps 90 and visual maps 92 may be located within the cloud database 42. The cloud database 42 may be connected to the mapping and map management module 68 so that the radar maps 90 and the visual maps 92 can be stored in or be downloaded from the cloud database 42. The sensor fusion module 70 may be connected to the image processing module 72 and to the measurement devices of the measurement unit 18.

In use, the user 12 secures the frame 14 to their head. The frame 14 has a bridge portion 96 that rests on a nose of the user 12 and temple pieces 98 that extend over the ears of the user 12 and secure to the ears of the user 12 or secure around the back of their head. The eyepieces 20 and 22 may be located in front of eyes of the user 12. All components mounted to the frame 14, including the radar system 16 and the measurement unit 18 may be stationary relative to the head of the user 12 and move together with the head of the user 12 when the user 12 moves their head.

The visual camera 28 continually captures a grayscale image of objects in front of the user 12. The visual tracking module 80 controls the visual camera 28. The visual mapping module 82 generates the visual map 86 based on the grayscale image received from the visual camera 28. The image processing module 72 processes the visual map 86 to determine objects within the visual map 86. The latest visual map 86 may be stored as the visual map 86 within the mapping and map management module 68 and earlier maps may be stored as the visual maps 92 within the cloud database 42. A "visual system" may be thus provided by the visual camera 28, visual tracking module 80, visual mapping module 82, the visual maps 86 and 92 and the image processing module 72.

Figure 4:
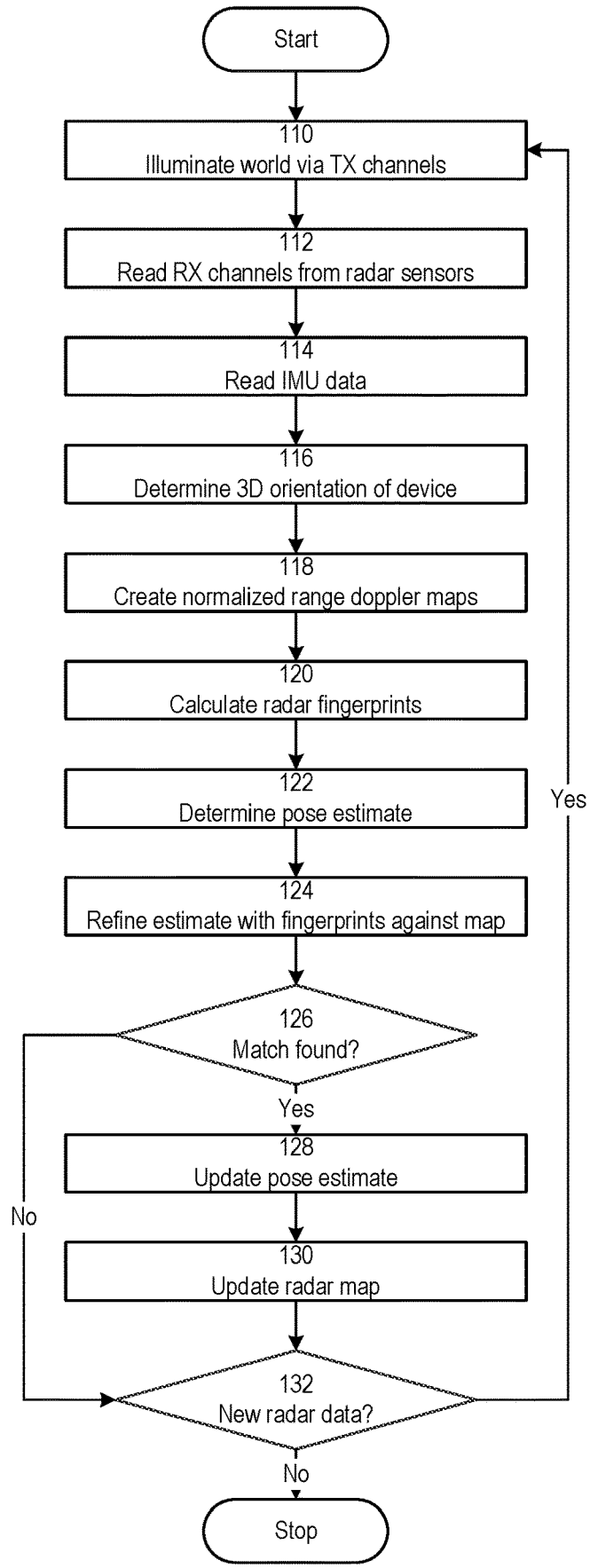
FIG. 4 is a flow chart illustrating how a radar system of the augmented reality device is used to correct for drift of a measurement unit of the augmented reality device.

FIG. 4 illustrates subsequent functioning of the augmented reality device 10 of FIGS. 1 and 3. At 110, the world may be illuminated via the TX channels. Referring to FIG. 3, each one of the radar transmitters 46 transmits a radio wave. The radio wave may be reflected from one or more surfaces and may be then detected by the respective radar receiver 48. The radio waves have frequencies on the order of 60 GHz, which allows for very accurate distance measurements to the surface or surfaces. In addition, multiple radio waves may be transmitted and detected at a frequency in the slow domain of approximately 100 Hz to 10 kHz. The frequency in the slow domain may be high enough to ensure a very fast sampling rate of distance measurements.

As shown in FIG. 1, the radar device 32 may be directed to the front of the user 12 to detect surfaces in front of the user 12. The radar device 30 may be directed to the left of the user 12. Although not clearly shown in FIG. 1, the radar device 34 may be directed in a vertical direction, i.e. out of the paper, to detect the location of a ceiling above the user 12. In the given embodiment, the radar devices 30, 32 and 34 are all located in the same plane, although, in another embodiment, they may be located in different planes. Another embodiment may use more than three radar devices to reduce search complexity, although three radar devices are optimal because it provides for a large number of degrees of freedom to be detected without unnecessary complexity in design.

The radar devices 30, 32 and 34 may be under the control of the radar tracking module 76. The radar tracking module 76 provides the frequency in the slow domain to the radar transmitters 46. The radar tracking module 76 also samples the radio waves through the radar receivers 48 in the fast domain. As is commonly understood in the field of radar engineering, a radio wave will take longer between transmission and reception when it is reflected from a surface that is farther away than from a closer surface. The time between transmission and reception may be in the fast domain and may be an indicator of the distance of the surface from which the radio wave is reflected. Each radar receiver 48 has an array of detectors that can detect the distances to surfaces over a two-dimensional area. In addition, the radar receivers 48 detect back scatter. Different types of surfaces have different back scatter properties and the back scatter is thus a measure of the type of surface, e.g. surface roughness or texture. The distance of each surface, its location in two-dimensional space, its size and the type of surface are all eventually used to provide a fingerprint that may include the individual surfaces and the surfaces in combination.

Figure 5:
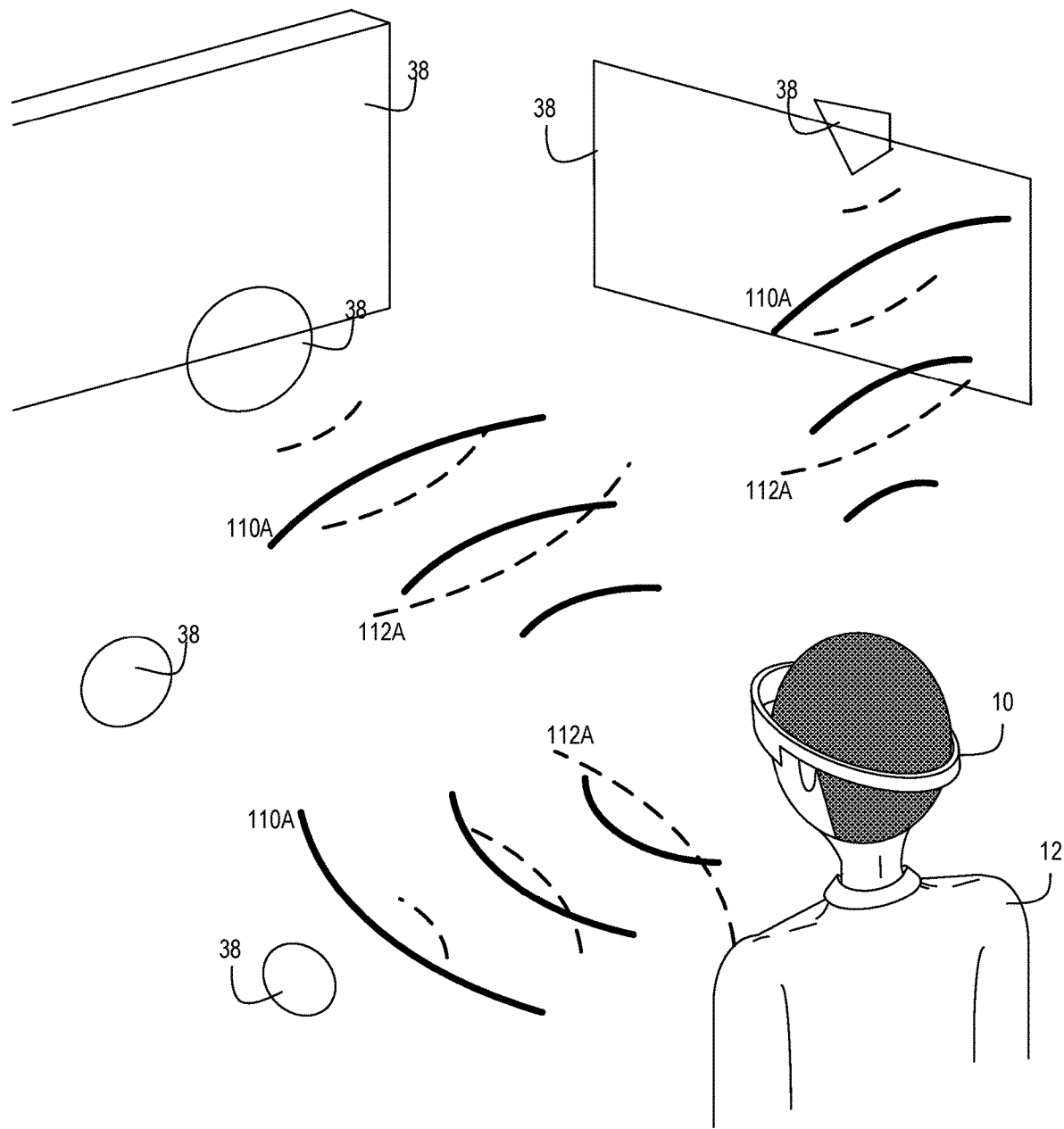
FIG. 5 is a perspective view illustrating the use of a radar system to detect surfaces around the augmented reality device.

FIG. 5 illustrates the transmission and reception of radio waves to the front, left and above the augmented reality device 10 that may be worn by the user 12. Each TX channel may transmit a respective radio wave 110A representing a respective TX signal and each RX channel may receive a respective radio wave 112A representing a respective RX signal. Surfaces are thus detected to the left and right of the augmented reality device 10 and a distance to a ceiling above the augmented reality device 10.

In FIG. 4, at 114, all IMU data may be read. The sensor fusion module 70 in FIG. 3 reads an output of the measurement unit 18, including the accelerometer 50, the gyroscope 52 and the magnetometer 54. At 116 in FIG. 4, a three-dimensional (3D) orientation of the device may be determined. In FIG. 3, the sensor fusion module 70 calculates a 3D orientation of the augmented reality device 10 based on the readings from the accelerometer 50, gyroscope 52 and the magnetometer 54.

In FIG. 4, at 118, normalized range-Doppler maps may be created. In FIG. 3, the radar mapping module 78 creates a map of all surfaces that are detected by the radar tracking module 76 and stores the map as the radar map 84. The radar map 84 may be a two-dimensional map that may include the surfaces, their locations and textures. The doppler maps may be normalized to compensate for motion (of the user, e.g. ego motion) based on data from the measurement unit 18.

Range-Doppler maps are well known in the art, and many radar sensor systems automatically create one or more range-doppler maps. In general, the system sends out one or more TX signals and one or more objects reflect the signal back (RX). The received signal may be converted to a range Doppler map using one or more manipulations, including conversion to a slow time/fast time chart, a windowed Fourier Fast Transform (FFT), and background subtraction. Other suitable methods of creating a range-Doppler map may be used, as long as the standard form is range on the y-axis and velocity on the x-axis.

Figure 6:
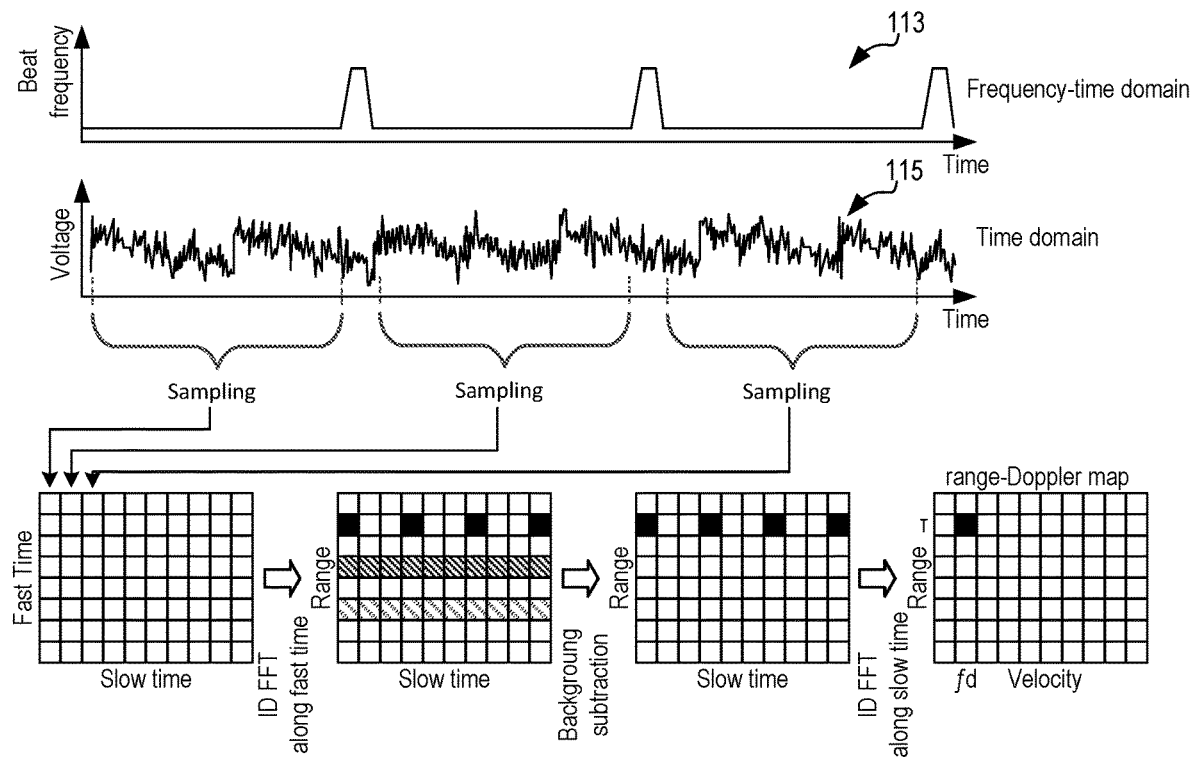
FIG. 6 is a time chart illustrating how a radar map is created.

FIG. 6 illustrates how a range-Doppler map may be created. FIG. 5 shows three radar sensors sending (110A), and receiving (112A) signals and in FIG. 6 each TX signal (110A) can be represented by a frequency domain graph 113 and each RX channel (112A) may be represented by a time domain graph 115. The frequency domain graph 113 shows that the respective TX channel may transmit a series of signal represented by pulses.

The time domain graph 115 shows the RX signal that is received in response to the pulses in the frequency domain graph 113. Reflected signals from objects that are farther away take a longer time to travel. Different voltage levels indicate different distances, due of the design of the RX circuitry.

The signal from the RX channel is divided into smaller sample pieces. The sample pieces of the RX signal are divided in time in accordance with the pulses in the TX signal.

Four matrices represent subsequent processing of the RX signal. The first matrix shows that the time domain graph 115 is transformed into slow time and fast time, each being represented on a respective axis. Each sample of the RX signal (between the pulses of the TX signal) is entered into its own column in the matrix. The second matrix show the result of a fast-Fourier transformation along the fast time. The fast time domain provides data regarding the range of different surfaces. Background subtraction in the third matrix allows for objects in the foreground to be isolated so that a moving object can be identified. The fourth matrix shows a fast-Fourier transformation along the slow time to create a range Doppler map that shows range and velocity on different axes.

After the range-Doppler maps have been calculated as discussed with reference to FIG. 6, the system then performs a calculation to compensate for the augmented reality device 10 due to movement of the user 12. When the correction for ego motion has been made, the system can determine whether the user 12 is moving past an object, or if the object is moving past the user 12.

The range-Doppler map only goes so far as to make a determination of the relative location of objects. For example, the range-Doppler map may show that there is a wall three feet away. A wall should not move if a correction for ego motion is made, i.e. the velocity of a wall should be zero. Without ego correction, if the user should walk towards the wall with a certain velocity, it would appear from the range Doppler map that the wall is moving. Once the system makes a correction to adjust for the ego motion, the wall will remain stationary within the range-Doppler map. The IMU data that is read at 114 in FIG. 4 is used to calculate a velocity of the user 12, which is used to correct for movement of the user.

Figure 7:
FIG. 7 is a radar map that illustrates objects that are detected to determine fingerprints.

In FIG. 4, at 120, radar fingerprints may be calculated. FIGS. 6 and 7 illustrate how radar fingerprints may be identified for one channel. Radar fingerprinting is an approach that renders a set of values that may be characteristic for given positions in a room. Of particular importance are the distances and angles to static objects. The radar fingerprint is the range-Doppler map wherein the range-Doppler map is corrected for ego motion. The only objects that are included in the radar fingerprint are the ones with zero velocity. By way of example, the stationary wall is included in the fingerprint, but not a hand of the user 12 or any effects due to movement of the user 12.

In FIG. 3, the image processing module 72 may be used to calculate the fingerprints. A radar system is thus provided that may include the radar devices 30, 32 and 34, the radar tracking module 76, the radar mapping module 78, the radar maps 84 and 90 and the image processing module 72.

In FIG. 4, the IMU data that may be read at 114 and the radar fingerprints that are calculated at 120 allow for a pose estimate to be determined at 122. Pose may be determined using geometric error minimization, although other geometric or other error minimization methods may be used. The pose estimate is a first pose estimate at a first time, t1. The IMU data is thus related to the fingerprints at t1. The pose estimate may be stored for later retrieval and later correction of IMU data at a second time, t2, in the slow domain.

In FIG. 4, at 124, the pose estimate can optionally be refined with fingerprints against the visual map 86. In FIG. 3, the map merge and optimization module 88 compares the fingerprints in the radar map 84 with the fingerprints in the visual map 86. The fingerprints in the radar map 84 are then updated with the fingerprints in the visual map 86. The latest radar map may be stored as the radar map 84 within the mapping and map management module 68 and earlier radar maps may be stored as the radar maps 90 in the cloud database 42. The radar maps 90 in the cloud database 42 can be used for additional calculations, e.g. for predictive calculations.

Referring again to FIG. 4, at 126, a determination may be made whether a match is found with an earlier pose estimate. For purposes of discussion, it may be assumed that at t1, there is no further pose estimate and the system does not proceed to 128 and 130, but instead proceeds to 132 to collect further radar data.

The sequence hereinbefore described with reference to FIG. 4 represent a first cycle at a first time t1 in the slow domain. Each radar device 30, 32 and 34 has captured surfaces and the surfaces may be used to determine a first set of radar fingerprints and a first pose may be calculated by combining the first fingerprints with data from the measurement unit 18.

At a second t2 in the slow domain, the system again proceeds to illuminate the world via the TX channels at 110. The process continues through 112 where the RX channels are read, 114 where the IMU data may be read, 116 where a 3D orientation of the device may be determined, 118 where normalized range-Doppler maps are created, 120 where radar fingerprints are calculated, 122 where a pose estimate may be determined, and 124 where the pose estimate may be refined with fingerprints from the visual map. At 126, a determination may be made whether an earlier set of radar fingerprints is available. In the present example, an earlier set of radar fingerprints was previously calculated at t1. The system then proceeds to 128 to update the pose estimate. Values that are provided by the measurement unit 18 drift over time and become inaccurate. The drifts are primarily the result of double integration of acceleration to obtain position. The amount of drift can be determined by comparing the first pose estimate with the second pose estimate. Necessary adjustments are then made to correct for the drift. The adjustments thus form an updated pose estimate. Fingerprints may only be stored long enough to correct for IMU drift and may then discarded. Fingerprints may be stored in a circular buffer or the like. More than one fingerprint can be retained, for example the last five fingerprints, so that a path of the drift can be calculated. Five or so fingerprints may also be useful for prediction IMU data drift, calculating time warping, or extrapolation purposes.

At 130, the radar map 84 is updated. The radar map 84 may need updating because it may be based on an incorrect set of data from the measurement unit 18. A comparison of the fingerprint with map allows the system to do absolute localization. "Relative localization" can be described by way of example to refer to adjusting the display of content relative to a wall that the user 12 is walking towards. "Absolute localization" can be described by way of example to refer to keeping a display of content on a table regardless even if the user would rotate their head from left to right, and/or when others can share in the experience with their own augmented reality devices.

By looking at consecutive sets of fingerprints, a unique 3D pose in a room can be obtained. The accuracy of the estimate quickly converges over time due to a high temporal frequency of the measurement unit 18 and the radar devices 30, 32 and 34. In FIG. 3, the sensor fusion module 70 may be responsible for determining each pose estimate, including a first post estimate at t1 and second pose estimate at t2. The sensor fusion module 70 also determines drift of the measurement unit 18 by comparing the first pose estimate with the second pose estimate, and makes any necessary adjustments for correcting for the drift.

Figure 8:
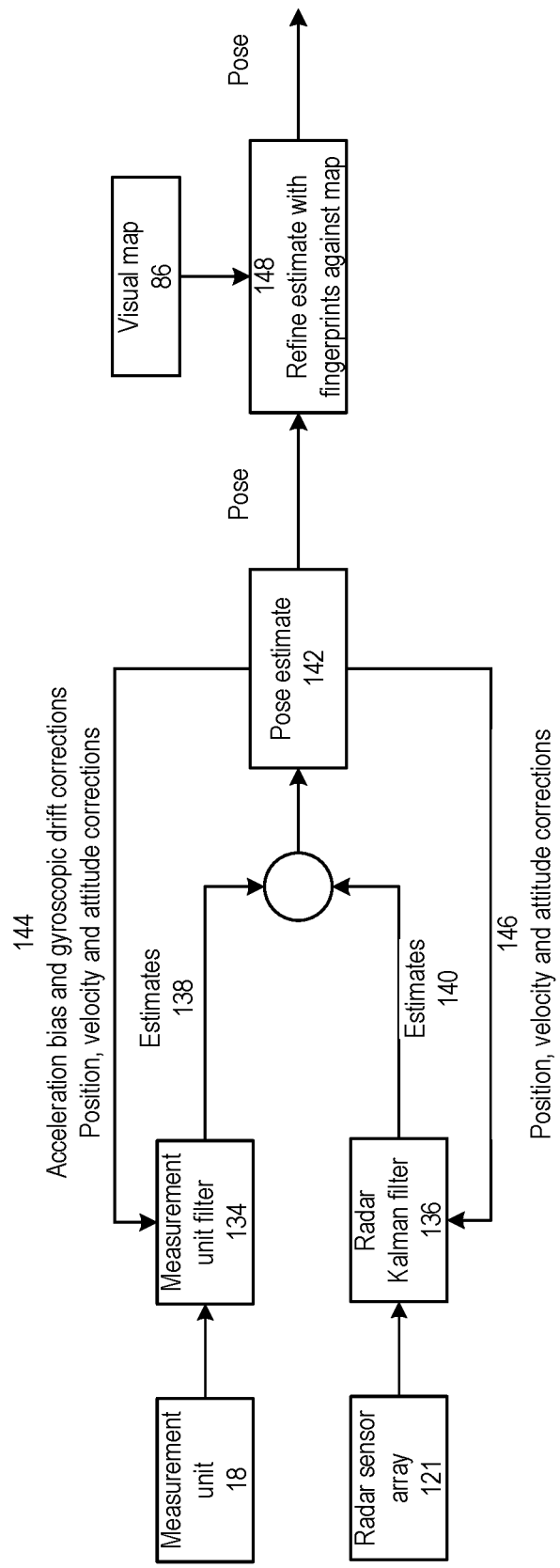
FIG. 8 is a block diagram illustrating how corrections are made to measurement unit data and radar sensor array data.

FIG. 8 illustrates the measurement unit 18 and a radar sensor array 121. The radar sensor array 121 may include the radar devices 30, 32 and 34 illustrated in FIGS. 1 and 3. Measurements taken by the measurement unit 18 pass through a measurement unit filter 134. Measurements taken by the radar sensor array 121 pass through a radar Kalman filter 136. An estimate 138 from the measurement unit filter 134 and an estimate 140 from the radar Kalman filter 136 are combined to calculate a pose estimate 142. At 144, the pose estimate 142 may be used to adjust the measurement unit filter 134. The adjustment corrects for the drift in the measurement unit 18. Adjustments that may be made at 144 include acceleration bias and gyroscopic drift corrections, and position, velocity and attitude corrections.

At 146, the pose estimate 130 may be used to adjust the radar Kalman filter 136. The adjustments that may be made at measurement unit filter 134 include position, velocity and attitude corrections.

At 148, a pose resulting from the pose estimate 142 and the visual map 86 may be combined to refine the estimate with the fingerprints against the visual map 86. The refinements result in a pose that may be more accurate than the pose estimate 142, due to the refinements provided by the visual map 86.

The measurements taken in FIG. 4, including measurements by the measurement unit 18, the radar sensor array 121 and the visual map 86 are all at the same time, e.g. t2. At a later time, t3, a new set of measurements can be taken, including a new set of measurements from the measurement unit 18, the radar sensor array 121 and a new visual map 86. Alternatively, all measurements may not be taken at exactly the same time. For example, the measurement unit 18 and the radar sensor array 121 may take measurements at slightly different times. An interpolation algorithm may be used to modify the measurements to obtain sets of measurement that represent measurements if the measurements were to be taken at the same time. Furthermore, the visual map 86 may be a visual map that may be taken at an earlier time than the measurements of the measurement unit 18 and the radar sensor array 121. For example, the visual map 86 may be taken at t1 and the measurements from the measurement unit 18 and the radar sensor array 121 may be taken at t2.

Figure 9:
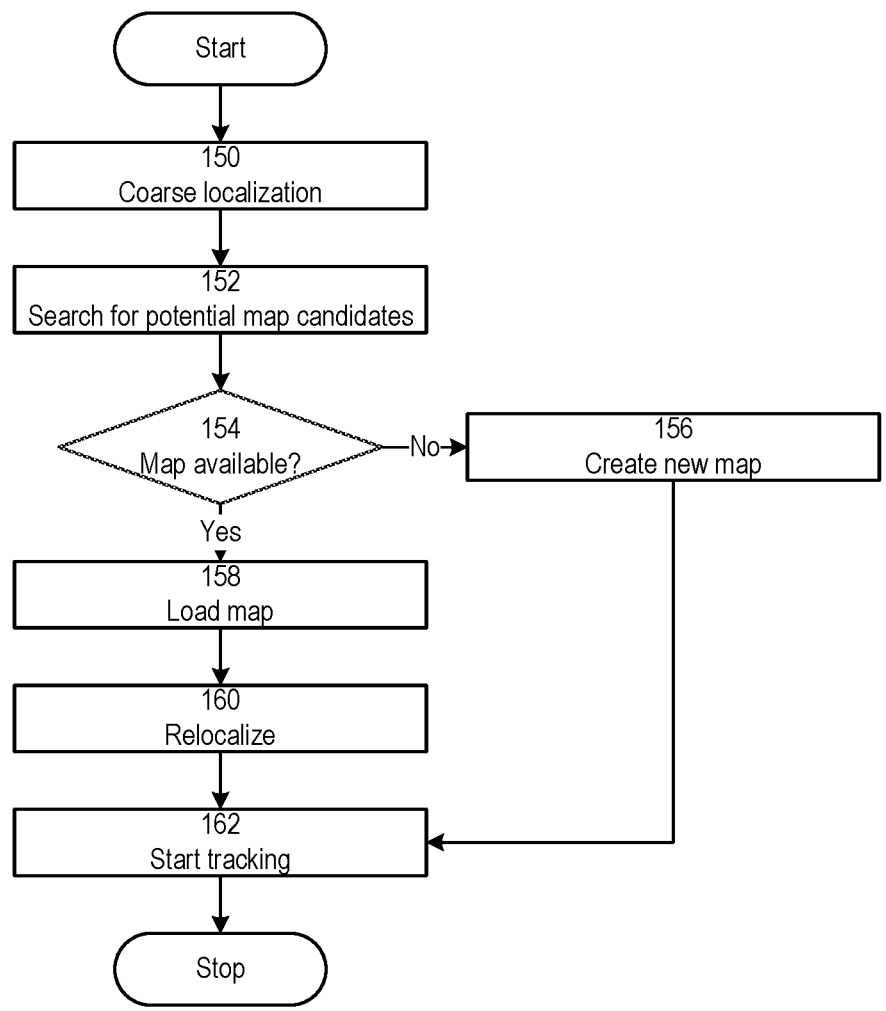
FIG. 9 is a flow chart illustrating an initiation process of the augmented reality device.

FIG. 9 illustrates initialization that takes place when the augmented reality device 10 may be powered on or put on the head of the user 12. At 150, the augmented reality device 10 carries out coarse localization. The augmented reality device 10 utilizes a global positioning system (GPS) and/or WIFI and/or Bluetooth™ of the environment to carry out coarse geo-location of the device 10. At 152, the device 10 searches whether a visual map may be locally available or available from the cloud database 42. At 154, the system determines whether a map is available. If no map is available, then the device 10 proceeds at 156 to create a new map.

If a map is available, then the device 10 proceeds at 158 to load the map. The device 10 then proceeds to 160 to initiate relocalization. During relocalization, the device 10 uses a circular buffer of radar sensors and IMU fingerprints to determine coarse localization. The device 10 then further refines a starting position by using depth sensor input. At 162, the device 10 starts tracking its movement using IMU data.

Referring again to FIG. 3, the rendering module 64 receives computer data representing an object that has to be rendered. The rendering module 64 also determines a location of the object based on the pose resulting from FIG. 8. The rendering module 64 then provides the data of the image and its locations based on the pose to the projectors 24 and 26 in FIG. 1. The projectors 24 and 26 convert the data into laser or other light and insert the light into the eyepieces 20 and 22. The projectors 24 and 26 each generate a pattern of laser light that renders the object and renders the object at a particular location relative to the pose. The laser light then reflects within the eyepieces 20 and 22 and then exits the eyepieces 20 and 22 towards the user 12. The laser light then enters eyes of the user 12 and the user perceives the laser light on retinas of their eyes. The user 12 can also see through the eyepieces 20 and 22. The user 12 can thus see real world objects behind the eyepieces 20 and 22 and the real-world objects are augmented with the rendered object. The rendered object may be a stationary object relative to the real-world objects. When the user 12 moves their head, the measurement unit 18 detects such movement and the pose may be updated so that the pose modifies relative to the real-world objects. Because the rendered object remains stationary relative to the pose, the rendered object remains stationary relative to the real-world objects in the view of the user 12. In alternate embodiments, the rendered object may be stationary relative to the user, or the rendered object may move relative to the user or real world objects.

In FIG. 3, the user interface 60 and the application interface 62 allow a user 12 to interact with other modules of the on-device software stack 40. For example, the user 12 may modify the frequency that a visual map or a radar map may be created or IMU data may be captured.

Figure 10:
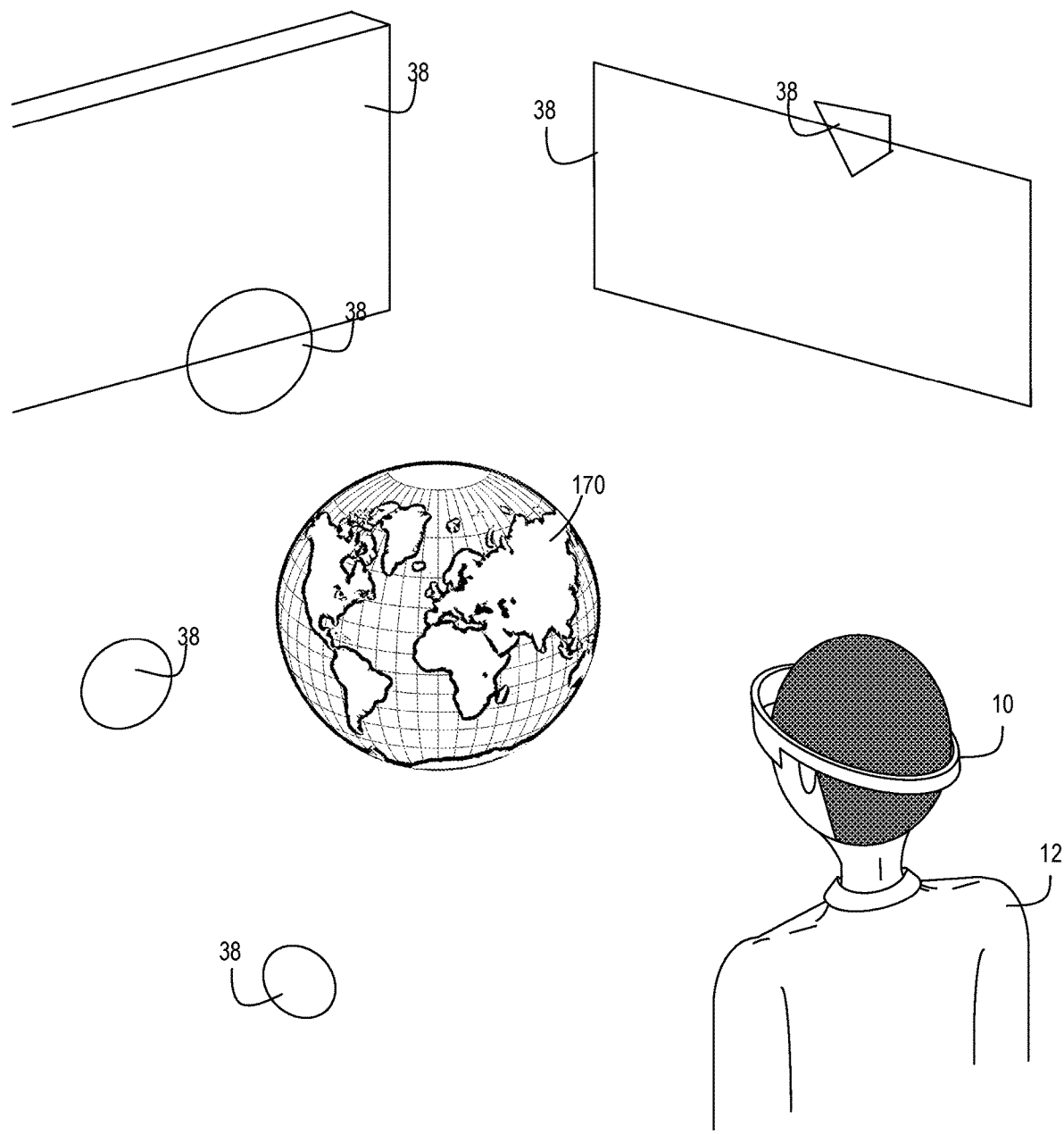
FIG. 10 illustrates a rendering, as seen by the user using the augmented reality device.

FIG. 10 illustrates a rendering, as seen by the user 12 using the augmented reality device 10. In the given example, the rendered object is a globe 170 and its position may be fixed relative to the real-world objects 38 when the user 12 moves their head. In FIG. 3, the rendering module 64 continues to track a change in the second pose by receiving measurement values from the measurement unit 18 after the object is displayed in the desired location and updates the desired location of the rendered object in response to the tracking of the change in the second pose.

As discussed above, a person may be wearing the augmented reality device 10 and, in order for the augmented reality content to be displayed correctly, the location of the augmented reality device 10 must be known. An IMU may provide good short term position estimation, but may suffer from drift problems over time. Radar data may be more accurate in the long term (but not in the short term), so is combined with IMU data to produce improved position data for both long and short term. The combined data is only accurate for determining relative location. The combined data can for example determine that the device is 3 feet away from a wall, but the device still does not know where in the world that wall or the user is. To provide accurate absolute position data of the device, a radar fingerprint may be created from the radar and IMU data and may be compared with data from an outward facing visual camera.

Figure 11:
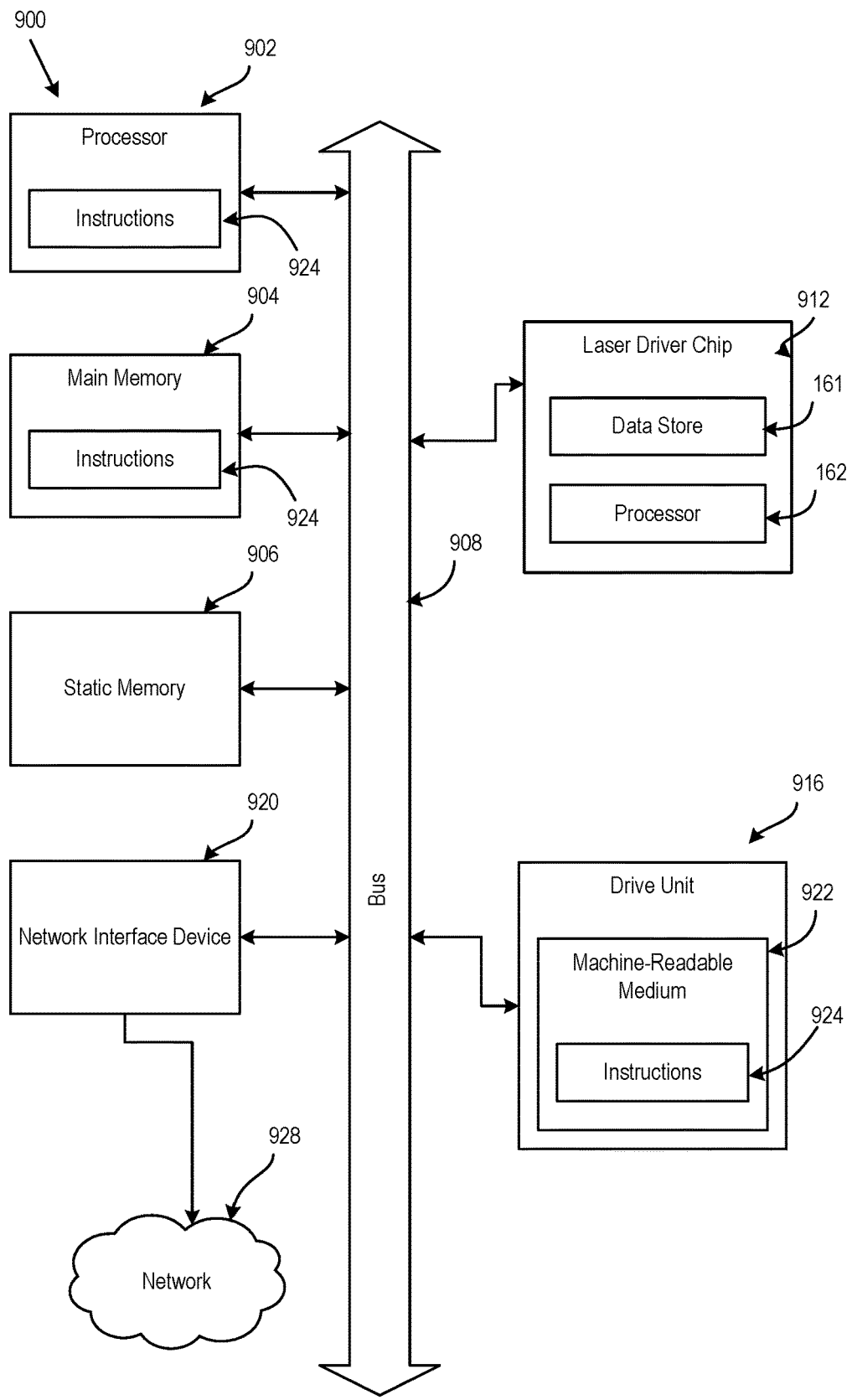
FIG. 11 is a block diagram of a machine in the form of a computer that can find application in the present invention system, in accordance with one embodiment of the invention.

FIG. 11 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908 and a laser driver chip 912 or other light source driver.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

A laser driver chip 912 includes a data store 161 and its own processor 162. The data store 161 is used to store instruction and data structures that are specific to the operation of a laser source. The processor 162 retrieves the instructions from the data store and has access to the data structures to execute routines that drive the laser source so that the laser source generates laser light. The laser source forms part of a projector that receives data such as video data. A scanner forms part of the projector to allow the projector to display the laser light over a two-dimensional area, and in some instances in three-dimensional space with any patterns, color, saturation and other light qualities that are created by the projector being based on values in the video data.

Although a laser source and a laser driver chip 912 have been illustrated and discussed, it may be possible to use other display systems. Other display systems may for example include displays that make use of light-emitting diode (LED) technology, organic light-emitting diode (OLED) technology, superluminescent light-emitting diode (SLED), or the like.

Example Embodiments

In some embodiments, the invention provides an augmented reality device including a head-mountable frame, a radar system that generates first and second sets of radar fingerprints of locations of real-world objects relative to the user at first and second times, a measurement unit, secured to the frame, and detecting first and second measurement values at the first and second times, each measurement value being indicative of at least one of position and movement of the measurement unit, a measurement unit filter connected to the measurement unit, a sensor fusion module connected to the radar system and the measurement unit and operable to (i) determine first and second pose estimates, the first pose estimate being based on the first set of radar fingerprints relative to the first measurement value and the second pose estimate being based on the second set of radar fingerprints relative to the second measurement value, (ii) determine a drift of the measurement unit by comparing the first pose estimate with the second pose estimate, and (iii) adjust the measurement unit filter to correct for the drift, a rendering module to determine a desired position of a rendered object based on the second pose, an eyepiece secured to the frame and a projector secured to the frame and operable to convert data into light to generate the rendered object and displaying the rendered object in the desired position to the user through the eyepiece.

In some embodiments, the augmented reality device may include that the radar system includes at least a first radar device having a first radar transmitter secured to the frame and transmitting a radio wave at first and second times in the slow domain, a first radar receiver secured to the frame and detecting the radio waves after the radio waves are reflected from a surface, a radar tracking module connected to the first radar receiver and determining first and second time intervals in a fast domain between the transmission and the detection of the radio waves, respectively, a radar mapping module connected to the radar tracking module and generating first and second radar maps of locations of real-world objects relative to the user based at least on the respective times in the fast domain and an image processing module connected to the radar mapping module and calculating a first and second sets of radar fingerprints based on the locations of the real-world objects in the first and second radar maps, respectively.

In some embodiments, the augmented reality device may include that the radar system includes at least a second radar device having a second radar transmitter secured to the frame and transmitting a radio wave at first and second times in a slow domain and a second radar receiver secured to the frame and detecting the radio waves transmitted by the second radar transmitter after the radio waves are reflected from a surface, wherein the radar tracking module is connected to the second radar receiver and determines first and second time intervals in the fast domain between the transmission and the detection of the respective radio waves transmitted by the second radar transmitter.

In some embodiments, the augmented reality device may include that the radar system includes at least a third radar device having a third radar transmitter secured to the frame and transmitting a radio wave at first and second times in a slow domain; and a third radar receiver secured to the frame and detecting the radio waves transmitted by the third radar transmitter after the radio waves are reflected from a surface, wherein the radar tracking module is connected to the third radar receiver and determines first and second time intervals in the fast domain between the transmission and the detection of the respective radio waves transmitted by the third radar transmitter.

In some embodiments, the augmented reality device may include that the first radar receiver detects back scatter from the surface and the image processing module calculates a texture of the surface based on the back scatter.

In some embodiments, the augmented reality device may include a visual system that includes a visual camera mounted to the frame to capture a first and second visual images of the real-world object, a visual tracking module connected to the visual camera and storing the first and second visual images at the first and second times in the slow domain, respectively, a visual mapping module connected to the visual tracking module and generating first and second visual maps of locations of real-world objects relative to the user based on the first and second visual images and a map merge and optimization module that refines the locations of the first and second sets of fingerprints based on the first and second visual maps, respectively.

In some embodiments, the augmented reality device may include a radar filter connected to the radar system, wherein the sensor fusion module adjusts the radar filter based on the second pose estimate.

In some embodiments, the augmented reality device may include that the rendering module tracks a change in the second pose by receiving measurement values from the measurement device after the object is displayed in the desired location and updates the desired location of the rendered object in response to the tracking of the change in the second pose.

In some embodiments, the augmented reality device may include that the sensor fusion module performs a coarse localization based on a wireless signal.

In some embodiments, the invention also provides an augmented reality device including a head-mountable frame, a radar system that includes at least a first radar device having a first radar transmitter secured to the frame and transmitting a radio wave at first and second times in a slow domain, a first radar receiver secured to the frame and detecting the radio waves after the radio waves are reflected from a surface, a radar tracking module connected to the first radar receiver and determining first and second time intervals in a fast domain between the transmission and the detection of the radio waves, respectively, a radar mapping module connected to the radar tracking module and generating first and second radar maps of locations of real-world objects relative to the user based at least on the respective times in the fast domain, an image processing module connected to the radar mapping module and calculating a first and second sets of radar fingerprints based on the locations of the real-world objects in the first and second radar maps, respectively, a measurement unit, secured to the frame, and detecting a first and second measurement values at the first and second times in the slow domain, each measurement value being indicative of at least one of position and movement of the measurement unit, a measurement unit filter connected to the measurement unit, a sensor fusion module connected to the image processing module and operable to (i) determine first and second pose estimates, the first pose estimate being based on the first set of radar fingerprints relative to the first measurement value and the second pose estimate being based on the second set of radar fingerprints relative to the second measurement value, (ii) determine drift of the measurement unit by comparing the first pose estimate with the second pose estimate, and (iii) adjust the measurement unit filter to correct for the drift, a rendering module to determine a desired position of a rendered object based on the second pose, an eyepiece secured to the frame; and a projector secured to the frame and operable to convert data into light to generate the rendered object and displaying the rendered object in the desired position to the user through the eyepiece.

In some embodiments, the invention further provides an augmented reality device including a head-mountable frame, a radar system secured to the frame that includes a radar transmitter secured to the frame and initiates execution of a first radar cycle by transmitting a first radio wave, a radar receiver secured to the frame and detecting the first radio wave after the first radio wave is reflected from a surface, a radar tracking module connected to the radar receiver and determining a first time between the transmission and the detection of the first radio wave, a radar mapping module connected to the radar tracking module and generating a first radar map of locations of real-world objects relative to the user based at least on the first time between the transmission and the detection of the first radio wave, an image processing module connected to the radar mapping module and calculating a first set of radar fingerprints based on the locations of the real-world objects in the first radar map to complete the first radar cycle, a measurement unit, secured to the frame, and detecting a first measurement value indicative of at least one of position and movement with a measurement unit secured to the frame, a sensor fusion module connected to the image processing module and the measurement unit and determining a first pose estimate of the first set of radar fingerprints relative to the first measurement value, wherein the radar system executes a second radar cycle including transmitting a second radio wave, detecting the second radio wave after the second radio wave is reflected from the surface, determining a second time between the transmission and the detection of the second radio wave, generating a second radar map of locations of real-world objects relative to the user based at least on the second time between the transmission and the detection of the second radio wave and calculating a second set of radar fingerprints based on the locations of the real-world objects in the second radar map, wherein the measurement unit detects a second measurement value indicative of a position and movement with the measurement unit secured to the frame, wherein the sensor fusion module determines a second pose estimate of the second set of radar fingerprints relative to the second measurement value, determining drift of the measurement unit by comparing the first pose estimate with the second pose estimate, adjusts a measurement unit filter that is connected to the measurement unit to correct for the drift, a rendering module to determine a desired position of a rendered object based on the second pose, an eyepiece secured to the frame and a projector secured to the frame and operable to convert data into light to generate the rendered object and displaying the rendered object in the desired position to the user through the eyepiece.

In some embodiments, the invention also provides an augmented reality device including a head-mountable frame, a radar system that generates first and second radar fingerprints of locations of real-world objects relative to the user at first and second times a visual system that includes a visual camera mounted to the frame to capture first and second visual images of the real-world objects, a visual tracking module connected to the visual camera and storing first and second visual images at the first and second time intervals, respectively, a visual mapping module connected to the visual tracking module and generating first and second visual maps of locations of real-world objects relative to the user based on the first and second visual images, a map merge and optimization module that refines the locations of the first and second sets of fingerprints based on the first and second visual maps, respectively, a rendering module to determine a desired position of a rendered object based on the first and second sets of fingerprints as refined by the map merge and optimization module, an eyepiece secured to the frame and a projector secured to the frame and operable to convert data into light to generate the rendered object and displaying the rendered object in the desired position to the user through the eyepiece.

In some embodiments, the invention further provides a method of displaying rendered content including attaching a head-mountable frame to a head of a user, executing a plurality of radar cycles to generate first and second radar fingerprints of locations of real-world objects relative to the user at first and second times in a slow domain, detecting first and second measurement values at the first and second times in the slow domain, each measurement value being indicative of at least one of position and movement, with a measurement unit secured to the frame, determining first and second pose estimates, the first pose estimate being based on the first set of radar fingerprints relative to the first measurement value and the second pose estimate being based on the second set of radar fingerprints relative to the second measurement value, determining drift of the measurement unit by comparing the first pose estimate with the second pose estimate, adjusting a measurement unit filter that is connected to the measurement unit to correct for the drift, determining a desired position of a rendered object based on the second pose estimate, converting data into light to generate the rendered object and displaying the rendered object in the desired position to the user through an eyepiece secured to the head-mountable frame.

In some embodiments, the method may include transmitting a radio wave at first and second times in the slow domain, detecting the radio waves after the radio waves are reflected from a surface, determining first and second time intervals in a fast domain between the transmission and the detection of the radio waves, respectively, generating first and second radar maps of locations of real-world objects relative to the user based at least on the respective times in the fast domain and calculating a first and second sets of radar fingerprints based on the locations of the real-world objects in the first and second radar maps, respectively.

In some embodiments, the method may include detecting back scatter from the surface and calculating a texture of the surface based on the back scatter.

In some embodiments, the method may include that the radar cycles include transmitting a radio wave at first and second times in the slow domain, detecting the radio waves after the radio waves are reflected from a surface, determining first and second time intervals in a fast domain between the transmission and the detection of the radio waves, respectively, generating first and second radar maps of locations of real-world objects relative to the user based at least on the respective times in the fast domain and calculating first and second sets of radar fingerprints based on the locations of the real-world objects in the first and second radar maps, respectively.

In some embodiments, the invention also provides a method of displaying rendered content including attaching a head-mountable frame to a head of a user, executing a plurality of radar cycles, including transmitting a radio wave at a first and second times in a slow domain, detecting the radio waves after the radio waves are reflected from a surface, determining first and second time intervals in a fast domain between the transmission and the detection of the radio waves, respectively, generating first and second radar maps of locations of real-world objects relative to the user based at least on the respective times in the fast domain and calculating first and second sets of radar fingerprints based on the locations of the real-world objects in the first and second radar maps, respectively, detecting a first and second measurement values at the first and second times in the slow domain, each measurement value being indicative of at least one of position and movement with a measurement unit secured to the frame, determining a first and second pose estimate, the first pose estimate being based on the first set of radar fingerprints relative to the first measurement value and the second pose estimate being based on the second set of radar fingerprints relative to the second measurement value, determining drift of the measurement unit by comparing the first pose estimate with the second pose estimate, adjusting a measurement unit filter that is connected to the measurement unit to correct for the drift, determining a desired position of a rendered object based on the second pose estimate, converting data into light to generate the rendered object and displaying the rendered object in the desired position to the user through an eyepiece secured to the head-mountable frame.

In some embodiments, the invention further provides a method of displaying rendered content including attaching a head-mountable frame to a head of a user, executing a first radar cycle, including transmitting a first radio wave, detecting the first radio wave after the first radio wave is reflected from a surface, determining a first time between the transmission and the detection of the first radio wave, generating a first radar map of locations of real-world objects relative to the user based at least on the first time between the transmission and the detection of the first radio wave and calculating a first set of radar fingerprints based on the locations of the real-world objects in the first radar map, detecting a first measurement value indicative of at least one of position and movement with a measurement unit secured to the frame, determining a first pose estimate of the first set of radar fingerprints relative to the first measurement value, executing a second radar cycle, including transmitting a second radio wave, detecting the second radio wave after the second radio wave is reflected from the surface, determining a second time between the transmission and the detection of the second radio wave, generating a second radar map of locations of real-world objects relative to the user based at least on the second time between the transmission and the detection of the second radio wave and calculating a second set of radar fingerprints based on the locations of the real-world objects in the second radar map, detecting a second measurement value indicative of a position and movement with the measurement unit secured to the frame, determining a second pose estimate of the second set of radar fingerprints relative to the second measurement value, determining drift of the measurement unit by comparing the first pose estimate with the second pose estimate, adjusting a measurement unit filter that is connected to the measurement unit to correct for the drift, determining a desired position of a rendered object based on the second pose estimate, converting data into light to generate the rendered object and displaying the rendered object in the desired position to the user through an eyepiece secured to the head-mountable frame.

In some embodiments, the invention also provides a method of displaying rendered content including attaching a head-mountable frame to a head of a user, executing a plurality of radar cycles to generate first and second radar fingerprints of locations of real-world objects relative to the user at first and second times in the slow domain, capturing first and second visual images of the real-world objects with a visual camera mounted to the frame to, storing the first and second visual images at the first and second times in the slow domain, respectively, generating first and second visual maps of locations of real-world objects relative to the user based on the first and second visual images, refining the locations of the first and second sets of fingerprints based on the first and second visual maps, respectively, determining a desired position of a rendered object based on the first and second sets of fingerprints as refined, converting data into light to generate the rendered object; and displaying the rendered object in the desired position to the user through an eyepiece secured to the head-mountable frame.

In some embodiments, the invention further provides an augmented reality device including a head-mountable frame, a radar system that generates first and second sets of radar fingerprints of locations of real-world objects relative to the user at first and second times in the slow domain, a measurement unit, secured to the frame, and detecting first and second measurement values at the first and second times in the slow domain, each measurement value being indicative of at least one of position and movement of the measurement unit, a measurement unit filter connected to the measurement unit, a processor, a computer-readable medium connected to the processor, a set of instructions on the computer-readable medium and executable by the processor to (i) determine first and second pose estimates, the first pose estimate being based on the first set of radar fingerprints relative to the first measurement value and the second pose estimate being based on the second set of radar fingerprints relative to the second measurement value, (ii) determine a drift of the measurement unit by comparing the first pose estimate with the second pose estimate, and (iii) adjust the measurement unit filter to correct for the drift; and (iv) determine a desired position of a rendered object based on the second pose, an eyepiece secured to the frame; and a projector secured to the frame and operable to convert data into light to generate the rendered object and displaying the rendered object in the desired position to the user through the eyepiece.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:
1. An augmented reality device comprising:
a head-mountable frame;
a radar system that generates first and second sets of radar fingerprints of locations of real-world objects relative to the user at first and second times;
a measurement unit, secured to the frame, and detecting first and second measurement values at the first and second times, each measurement value being indicative of at least one of position and movement of the measurement unit;
a measurement unit filter connected to the measurement unit;
a sensor fusion module connected to the radar system and the measurement unit and operable to (i) determine first and second pose estimates, the first pose estimate being based on the first set of radar fingerprints relative to the first measurement value and the second pose estimate being based on the second set of radar fingerprints relative to the second measurement value, (ii) determine a drift of the measurement unit by comparing the first pose estimate with the second pose estimate, and (iii) adjust the measurement unit filter to correct for the drift;
a rendering module to determine a desired position of a rendered object based on the second pose;
an eyepiece secured to the frame; and
a projector secured to the frame and operable to convert data into light to generate the rendered object and displaying the rendered object in the desired position to the user through the eyepiece.

2. The augmented reality device of claim 1, wherein the radar system includes:
at least a first radar device having:
a first radar transmitter secured to the frame and transmitting a radio wave at first and second times in the slow domain;
a first radar receiver secured to the frame and detecting the radio waves after the radio waves are reflected from a surface;
a radar tracking module connected to the first radar receiver and determining first and second time intervals in a fast domain between the transmission and the detection of the radio waves, respectively;
a radar mapping module connected to the radar tracking module and generating first and second radar maps of locations of real-world objects relative to the user based at least on the respective times in the fast domain; and
an image processing module connected to the radar mapping module and calculating a first and second sets of radar fingerprints based on the locations of the real-world objects in the first and second radar maps, respectively.

3. The augmented reality device of claim 2, wherein the radar system includes:
at least a second radar device having:
a second radar transmitter secured to the frame and transmitting a radio wave at first and second times in a slow domain; and
a second radar receiver secured to the frame and detecting the radio waves transmitted by the second radar transmitter after the radio waves are reflected from a surface, wherein the radar tracking module is connected to the second radar receiver and determines first and second time intervals in the fast domain between the transmission and the detection of the respective radio waves transmitted by the second radar transmitter.

4. The augmented reality device of claim 3, wherein the radar system includes:
at least a third radar device having:
a third radar transmitter secured to the frame and transmitting a radio wave at first and second times in a slow domain; and
a third radar receiver secured to the frame and detecting the radio waves transmitted by the third radar transmitter after the radio waves are reflected from a surface, wherein the radar tracking module is connected to the third radar receiver and determines first and second time intervals in the fast domain between the transmission and the detection of the respective radio waves transmitted by the third radar transmitter.

5. The augmented reality device of claim 2, wherein the first radar receiver detects back scatter from the surface and the image processing module calculates a texture of the surface based on the back scatter.

6. The augmented reality device of claim 1, further comprising:
a visual system that includes:
a visual camera mounted to the frame to capture a first and second visual images of the real-world object;
a visual tracking module connected to the visual camera and storing the first and second visual images at the first and second times in the slow domain, respectively;
a visual mapping module connected to the visual tracking module and generating first and second visual maps of locations of real-world objects relative to the user based on the first and second visual images; and
a map merge and optimization module that refines the locations of the first and second sets of fingerprints based on the first and second visual maps, respectively.

7. The augmented reality device of claim 1, further comprising:
a radar filter connected to the radar system, wherein the sensor fusion module adjusts the radar filter based on the second pose estimate.

8. The augmented reality device of claim 1, wherein the rendering module tracks a change in the second pose by receiving measurement values from the measurement device after the object is displayed in the desired location and updates the desired location of the rendered object in response to the tracking of the change in the second pose.

9. The augmented reality device of claim 1, wherein the sensor fusion module performs a coarse localization based on a wireless signal.

10. An augmented reality device comprising:
a head-mountable frame;
a radar system that includes:
at least a first radar device having:
a first radar transmitter secured to the frame and transmitting a radio wave at first and second times in a slow domain;
a first radar receiver secured to the frame and detecting the radio waves after the radio waves are reflected from a surface;
a radar tracking module connected to the first radar receiver and determining first and second time intervals in a fast domain between the transmission and the detection of the radio waves, respectively;
a radar mapping module connected to the radar tracking module and generating first and second radar maps of locations of real-world objects relative to the user based at least on the respective times in the fast domain;
an image processing module connected to the radar mapping module and calculating a first and second sets of radar fingerprints based on the locations of the real-world objects in the first and second radar maps, respectively;
a measurement unit, secured to the frame, and detecting a first and second measurement values at the first and second times in the slow domain, each measurement value being indicative of at least one of position and movement of the measurement unit;
a measurement unit filter connected to the measurement unit;
a sensor fusion module connected to the image processing module and operable to (i) determine first and second pose estimates, the first pose estimate being based on the first set of radar fingerprints relative to the first measurement value and the second pose estimate being based on the second set of radar fingerprints relative to the second measurement value, (ii) determine drift of the measurement unit by comparing the first pose estimate with the second pose estimate, and (iii) adjust the measurement unit filter to correct for the drift;
a rendering module to determine a desired position of a rendered object based on the second pose;
an eyepiece secured to the frame; and
a projector secured to the frame and operable to convert data into light to generate the rendered object and displaying the rendered object in the desired position to the user through the eyepiece.

11. An augmented reality device comprising:
a head-mountable frame;
a radar system secured to the frame that includes:
a radar transmitter secured to the frame and initiates execution of a first radar cycle by transmitting a first radio wave;
a radar receiver secured to the frame and detecting the first radio wave after the first radio wave is reflected from a surface;
a radar tracking module connected to the radar receiver and determining a first time between the transmission and the detection of the first radio wave;
a radar mapping module connected to the radar tracking module and generating a first radar map of locations of real-world objects relative to the user based at least on the first time between the transmission and the detection of the first radio wave;
an image processing module connected to the radar mapping module and calculating a first set of radar fingerprints based on the locations of the real-world objects in the first radar map to complete the first radar cycle;
a measurement unit, secured to the frame, and detecting a first measurement value indicative of at least one of position and movement with a measurement unit secured to the frame;
a sensor fusion module connected to the image processing module and the measurement unit and determining a first pose estimate of the first set of radar fingerprints relative to the first measurement value;
wherein the radar system executes a second radar cycle, including:
transmitting a second radio wave;
detecting the second radio wave after the second radio wave is reflected from the surface;
determining a second time between the transmission and the detection of the second radio wave;
generating a second radar map of locations of real-world objects relative to the user based at least on the second time between the transmission and the detection of the second radio wave; and
calculating a second set of radar fingerprints based on the locations of the real-world objects in the second radar map;
wherein the measurement unit detects a second measurement value indicative of a position and movement with the measurement unit secured to the frame;
wherein the sensor fusion module:
determines a second pose estimate of the second set of radar fingerprints relative to the second measurement value;
determining drift of the measurement unit by comparing the first pose estimate with the second pose estimate;
adjusts a measurement unit filter that is connected to the measurement unit to correct for the drift;
a rendering module to determine a desired position of a rendered object based on the second pose;
an eyepiece secured to the frame; and
a projector secured to the frame and operable to convert data into light to generate the rendered object and displaying the rendered object in the desired position to the user through the eyepiece.

12. An augmented reality device comprising:
a head-mountable frame;
a radar system that generates first and second radar fingerprints of locations of real-world objects relative to the user at first and second times;
a visual system that includes:
a visual camera mounted to the frame to capture first and second visual images of the real-world objects;
a visual tracking module connected to the visual camera and storing first and second visual images at the first and second time intervals, respectively;
a visual mapping module connected to the visual tracking module and generating first and second visual maps of locations of real-world objects relative to the user based on the first and second visual images;
a map merge and optimization module that refines the locations of the first and second sets of fingerprints based on the first and second visual maps, respectively;
a rendering module to determine a desired position of a rendered object based on the first and second sets of fingerprints as refined by the map merge and optimization module;
an eyepiece secured to the frame; and
a projector secured to the frame and operable to convert data into light to generate the rendered object and displaying the rendered object in the desired position to the user through the eyepiece.

13. A method of displaying rendered content comprising:
attaching a head-mountable frame to a head of a user;
executing a plurality of radar cycles to generate first and second radar fingerprints of locations of real-world objects relative to the user at first and second times in a slow domain;
detecting first and second measurement values at the first and second times in the slow domain, each measurement value being indicative of at least one of position and movement, with a measurement unit secured to the frame;
determining first and second pose estimates, the first pose estimate being based on the first set of radar fingerprints relative to the first measurement value and the second pose estimate being based on the second set of radar fingerprints relative to the second measurement value;
determining drift of the measurement unit by comparing the first pose estimate with the second pose estimate;
adjusting a measurement unit filter that is connected to the measurement unit to correct for the drift;
determining a desired position of a rendered object based on the second pose estimate;
converting data into light to generate the rendered object; and
displaying the rendered object in the desired position to the user through an eyepiece secured to the head-mountable frame.

14. The method of claim 13, further comprising:
transmitting a radio wave at first and second times in the slow domain;
detecting the radio waves after the radio waves are reflected from a surface;
determining first and second time intervals in a fast domain between the transmission and the detection of the radio waves, respectively;
generating first and second radar maps of locations of real-world objects relative to the user based at least on the respective times in the fast domain; and
calculating a first and second sets of radar fingerprints based on the locations of the real-world objects in the first and second radar maps, respectively.

15. The method of claim 14, further comprising:
detecting back scatter from the surface; and
calculating a texture of the surface based on the back scatter.

16. The method of claim 13, wherein the radar cycles include:
transmitting a radio wave at first and second times in the slow domain;
detecting the radio waves after the radio waves are reflected from a surface;
determining first and second time intervals in a fast domain between the transmission and the detection of the radio waves, respectively;
generating first and second radar maps of locations of real-world objects relative to the user based at least on the respective times in the fast domain; and
calculating first and second sets of radar fingerprints based on the locations of the real-world objects in the first and second radar maps, respectively.

17. A method of displaying rendered content comprising:
attaching a head-mountable frame to a head of a user;
executing a plurality of radar cycles, including:
transmitting a radio wave at a first and second times in a slow domain;
detecting the radio waves after the radio waves are reflected from a surface;
determining first and second time intervals in a fast domain between the transmission and the detection of the radio waves, respectively;
generating first and second radar maps of locations of real-world objects relative to the user based at least on the respective times in the fast domain; and
calculating first and second sets of radar fingerprints based on the locations of the real-world objects in the first and second radar maps, respectively;
detecting a first and second measurement values at the first and second times in the slow domain, each measurement value being indicative of at least one of position and movement with a measurement unit secured to the frame;
determining a first and second pose estimate, the first pose estimate being based on the first set of radar fingerprints relative to the first measurement value and the second pose estimate being based on the second set of radar fingerprints relative to the second measurement value;
determining drift of the measurement unit by comparing the first pose estimate with the second pose estimate;
adjusting a measurement unit filter that is connected to the measurement unit to correct for the drift;
determining a desired position of a rendered object based on the second pose estimate;
converting data into light to generate the rendered object; and
displaying the rendered object in the desired position to the user through an eyepiece secured to the head-mountable frame.

18. A method of displaying rendered content comprising:
attaching a head-mountable frame to a head of a user;
executing a first radar cycle, including:
transmitting a first radio wave;
detecting the first radio wave after the first radio wave is reflected from a surface;
determining a first time between the transmission and the detection of the first radio wave;
generating a first radar map of locations of real-world objects relative to the user based at least on the first time between the transmission and the detection of the first radio wave; and
calculating a first set of radar fingerprints based on the locations of the real-world objects in the first radar map;
detecting a first measurement value indicative of at least one of position and movement with a measurement unit secured to the frame;
determining a first pose estimate of the first set of radar fingerprints relative to the first measurement value;
executing a second radar cycle, including:
transmitting a second radio wave;
detecting the second radio wave after the second radio wave is reflected from the surface;
determining a second time between the transmission and the detection of the second radio wave;
generating a second radar map of locations of real-world objects relative to the user based at least on the second time between the transmission and the detection of the second radio wave; and
calculating a second set of radar fingerprints based on the locations of the real-world objects in the second radar map;
detecting a second measurement value indicative of a position and movement with the measurement unit secured to the frame;
determining a second pose estimate of the second set of radar fingerprints relative to the second measurement value;
determining drift of the measurement unit by comparing the first pose estimate with the second pose estimate;
adjusting a measurement unit filter that is connected to the measurement unit to correct for the drift;
determining a desired position of a rendered object based on the second pose estimate;
converting data into light to generate the rendered object; and
displaying the rendered object in the desired position to the user through an eyepiece secured to the head-mountable frame.

19. A method of displaying rendered content comprising:
attaching a head-mountable frame to a head of a user;
executing a plurality of radar cycles to generate first and second radar fingerprints of locations of real-world objects relative to the user at first and second times in the slow domain;
capturing first and second visual images of the real-world objects with a visual camera mounted to the frame to;
storing the first and second visual images at the first and second times in the slow domain, respectively;
generating first and second visual maps of locations of real-world objects relative to the user based on the first and second visual images;
refining the locations of the first and second sets of fingerprints based on the first and second visual maps, respectively;
determining a desired position of a rendered object based on the first and second sets of fingerprints as refined;
converting data into light to generate the rendered object; and
displaying the rendered object in the desired position to the user through an eyepiece secured to the head-mountable frame.

20. An augmented reality device comprising:
a head-mountable frame;
a radar system that generates first and second sets of radar fingerprints of locations of real-world objects relative to the user at first and second times in the slow domain;

a measurement unit, secured to the frame, and detecting first and second measurement values at the first and second times in the slow domain, each measurement value being indicative of at least one of position and movement of the measurement unit;

a measurement unit filter connected to the measurement unit;

a processor;

a computer-readable medium connected to the processor;

a set of instructions on the computer-readable medium and executable by the processor to (i) determine first and second pose estimates, the first pose estimate being based on the first set of radar fingerprints relative to the first measurement value and the second pose estimate being based on the second set of radar fingerprints relative to the second measurement value, (ii) determine a drift of the measurement unit by comparing the first pose estimate with the second pose estimate, and (iii) adjust the measurement unit filter to correct for the drift; and (iv) determine a desired position of a rendered object based on the second pose;

an eyepiece secured to the frame; and a projector secured to the frame and operable to convert data into light to generate the rendered object and displaying the rendered object in the desired position to the user through the eyepiece.

* * * * *